(12) United States Patent
Jung et al.

(10) Patent No.: US 9,491,708 B2
(45) Date of Patent: Nov. 8, 2016

(54) METHOD FOR TRANSMITTING SIGNAL IN WIRELESS ACCESS SYSTEM AND APPARATUS FOR SAME

(75) Inventors: Manyoung Jung, Anyang-si (KR); Suhwan Lim, Anyang-si (KR); Yoonoh Yang, Anyang-si (KR); Sangwook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 14/119,066

(22) PCT Filed: Jun. 15, 2012

(86) PCT No.: PCT/KR2012/004752
§ 371 (c)(1),
(2), (4) Date: Nov. 20, 2013

(87) PCT Pub. No.: WO2012/173430
PCT Pub. Date: Dec. 20, 2012

(65) Prior Publication Data
US 2014/0086195 A1  Mar. 27, 2014

Related U.S. Application Data

(60) Provisional application No. 61/497,503, filed on Jun. 15, 2011.

(51) Int. Cl.
*H04W 52/14* (2009.01)
*H04W 52/36* (2009.01)

(52) U.S. Cl.
CPC ......... *H04W 52/146* (2013.01); *H04W 52/367* (2013.01); *Y02B 60/50* (2013.01)

(58) Field of Classification Search
CPC ............. H04W 52/14; H04W 52/146; H04W 52/367; Y02B 60/50
See application file for complete search history.

(56) References Cited

U.S. PATENT DOCUMENTS

| 7,260,415 | B1 * | 8/2007 | Oh | |
| 7,454,223 | B2 * | 11/2008 | Mantha et al. | 455/522 |
| 2010/0067496 | A1 * | 3/2010 | Choi | 370/336 |
| 2011/0199949 | A1 * | 8/2011 | Lee | |
| 2011/0223964 | A1 * | 9/2011 | Ebiko | 455/522 |
| 2011/0319119 | A1 * | 12/2011 | Ishii | 455/522 |

(Continued)

FOREIGN PATENT DOCUMENTS

| JP | 2010-171931 A | 8/2010 |
| JP | 2010-279018 A | 12/2010 |
| KR | 10-2011-0050329 A | 5/2011 |

*Primary Examiner* — Parth Patel
*Assistant Examiner* — Kai Chang
(74) *Attorney, Agent, or Firm* — Birch, Stewart, Kolasch & Birch, LLP

(57) ABSTRACT

In the present invention, a method for transmitting a signal in a wireless access system and an apparatus for same are disclosed, which more particularly, comprise the steps of: receiving additional maximum power reduction (A-MPR) according to a first network signaling from a base station, when network signaling that is received from the base station is identical to the first network signaling that is predetermined; reducing maximum transmission power of a terminal using the A-MPR which is received; and transmitting an uplink signal to the base station within the scope of the maximum transmission power of the terminal that is reduced, wherein the A-MPR is outputted by considering interference from frequencies adjacent to a band that is allocated to the terminal.

12 Claims, 19 Drawing Sheets

(56) References Cited

U.S. PATENT DOCUMENTS

| | | |
|---|---|---|
| 2011/0319120 A1* | 12/2011 | Chen |
| 2012/0044898 A1* | 2/2012 | Ishii ............................ 370/329 |
| 2012/0113848 A1* | 5/2012 | Kim et al. .................. 370/252 |
| 2012/0127933 A1* | 5/2012 | Worrall et al. ............. 370/329 |
| 2012/0163202 A1* | 6/2012 | Aguirre |
| 2012/0176979 A1* | 7/2012 | Kim |
| 2012/0178494 A1* | 7/2012 | Haim |
| 2012/0207112 A1* | 8/2012 | Kim |
| 2012/0231834 A1 | 9/2012 | Seo et al. |
| 2013/0022095 A1* | 1/2013 | Pesola ................. H04W 28/048 375/222 |
| 2013/0039289 A1* | 2/2013 | Lee et al. .................... 370/329 |
| 2013/0182583 A1* | 7/2013 | Siomina et al. ............ 370/252 |
| 2013/0182661 A1* | 7/2013 | Piipponen ......... H04W 72/0473 370/329 |
| 2013/0310105 A1* | 11/2013 | Sagae et al. ................ 455/522 |

\* cited by examiner (a)

(b)

METHOD FOR TRANSMITTING SIGNAL IN WIRELESS ACCESS SYSTEM AND APPARATUS FOR SAME

CROSS REFERENCE TO RELATED APPLICATIONS

This non-provisional application is a National Stage entry under U.S.C. §371 of International Application No. PCT/KR2012/004752 filed on Jun. 15, 2012, which claims the benefit of U.S. Provisional Application No. 61/497,503 filed on Jun. 15, 2011. The entire contents of all of the above applications are hereby incorporated by reference.

TECHNICAL FIELD

The present invention relates to a wireless access system, and more particularly, to a method for transmitting an uplink signal by controlling uplink transmission power and an apparatus for the method.

BACKGROUND ART

Generally, a wireless communication system is a multiple access system capable of supporting communication with multiple users by sharing available system resources (bandwidth, transmission power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Wireless communication systems have been widely deployed to provide various types of communication services such as voice or data services. Due to dramatic increase in data use as the number of users increases, more frequency bands are required and thus interference problems between adjacent bands have arisen.

DISCLOSURE

Technical Problem

An object of the present invention devised to solve the problem lies in a method and apparatus for effectively controlling transmission power in order to minimize interference influence on a adjacent band in a wireless access system.

In addition, another object of the present invention devised to solve the problem lies in a method and apparatus for providing various types of additional maximum power reduction (A-MPR) using limited network signaling.

It is to be understood that both the foregoing general description and the following detailed description of the present invention are exemplary and explanatory and are intended to provide further explanation of the invention as claimed.

Technical Solution

The object of the present invention can be achieved by providing a method for transmitting a signal by a user equipment (UE) in a wireless access system, the method including receiving additional maximum power reduction (A-MPR) according to first network signaling from a base station (BS) when the network signaling received from the BS is the same as predefined first network signaling, reducing UE maximum transmission power using the received A-MPR, and transmitting an uplink signal to the BS within a range of the reduced UE maximum transmission power, wherein the A-MPR is calculated in consideration of whether interference occurs in an adjacent frequency of a band allocated to the UE.

In another aspect of the present invention, provided herein is a user equipment (UE) for transmitting a signal to a base station (BS) in a wireless access system, the UE including a radio frequency (RF) unit for transmitting and receiving a radio signal, and a processor for receiving additional maximum power reduction (A-MPR) according to first network signaling from a base station (BS) when the network signaling received from the BS is the same as predefined first network signaling, reducing UE maximum transmission power using the received A-MPR, and transmitting an uplink signal to the BS within a range of the reduced UE maximum transmission power, wherein the A-MPR is calculated in consideration of whether interference occurs in an adjacent frequency of a band allocated to the UE.

The method may further include transmitting at least one of location information of the UE and performance information of a radio frequency (RF) unit installed in the UE to the BS, wherein the A-MPR is calculated using at least one of the location information of the UE and the performance information of the RF unit installed in the UE.

The A-MPR may be calculated using at least one of use information of an adjacent frequency allocated to the UE, permissible service interference degree of a system using an adjacent band, and radio resource use degree in a neighboring BS.

The UE may receive the network signaling during connection with the BS, for registration or location-updating.

The network signaling may be received through a system information block type 2 (SIB2).

The first network signaling may be NS_32.

Advantageous Effects

According to embodiments of the present invention, transmission power of a user equipment (UE) in a wireless access system may be controlled to minimize interference influence on a adjacent band.

In addition, according to embodiments of the present invention, various types of additional maximum power reduction (A-MPR) may be effectively provided to a UE using limited network signaling.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
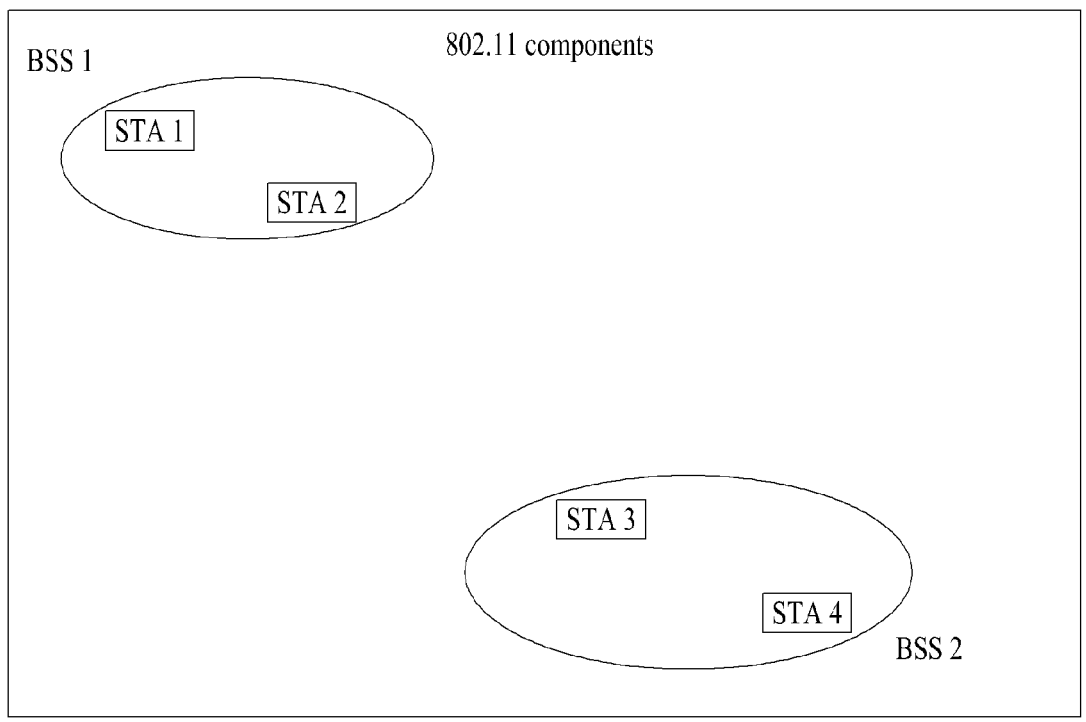
FIG. 1 illustrates an exemplary structure of a WLAN system.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point (AP) as necessary. The term "relay" may be replaced with the terms relay node (RN) or relay station (RS). The term "terminal" may also be replaced with a user equipment (UE), a mobile station (MS), a mobile subscriber station (MSS), a subscriber station (SS), or a station (STA) as necessary.

It should be noted that specific terms disclosed in the present invention are proposed for convenience of description and better understanding of the present invention, and the use of these specific terms may be changed to other formats within the technical scope or spirit of the present invention.

The embodiments of the present invention can be supported by standard documents disclosed for at least one of wireless access systems, institute of electrical and electronics engineers (IEEE) 802, $3^{rd}$ generation partnership project (3GPP), 3GPP long term evolution (3GPP LTE), LTE-advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE and LTE-A systems. However, the technical features of the present invention are not limited thereto. Hereinafter, transmission power may be represented in a linear scale or a dB scale. In addition, operations according to an embodiment of the present invention may be performed in a power domain or an amplitude domain.

1. Overview of Wireless Local Area Network (WLAN) System According to the Present Invention The standard for a WLAN technology is established by institute of electrical and electronics engineers (IEEE) 802.11 standard association. IEEE 802.11a and b uses an unlicensed band on 2.4. GHz or 5 GHz. IEEE 802.11b provides transmission efficiency of 11 Mbps. IEEE 802.11a provides transmission efficiency of 54 Mbps. IEEE 802.11g adapts orthogonal frequency-division multiplexing on 2.4 GHz to provide transmission efficiency of 54 Mbps. IEEE 802.11n adapts multiple input multiple output-OFDM (MIMO-OFDM) to provide transmission efficiency of 300 Mbps for 4 spatial streams. IEEE 802.11n40 MHz channel bandwidth, and in this case it provides up to 600 Mbps transmission efficiency.

FIG. 1 illustrates an exemplary structure of a WLAN system.

Referring to FIG. 1, the WLAN system includes one or more basic service sets (BSSs). The BSS is a set of stations (STAs) that can communicate in synchronization with each other. FIG. 1 illustrates two BSSs and two STAs that accesses the respective BSSs. In FIG. 1 a region indicated by an oval refers to a coverage area that is called a basic service area (BSA). When a STA moves out of its BSA, the STA cannot no longer directly communicate with other STAs present in the BSA.

The BSS is categorized into an independent BSS (IBBS) and infrastructure BSS (BSS). The IBBS is a most basic type of the WLAN system and is illustrated in FIG. 1. In the IBBS, STAs can directly communicate with each other. This type of operation is referred to as an ad hoc network.

In order to access the BSS, an STA needs to perform a synchronization procedure with a BS. In order to access all services of the infrastructure BSS, the STA needs to be associated with the BS. These associations are dynamic and involve the use of a distribution system service (DSS).

Figure 2:
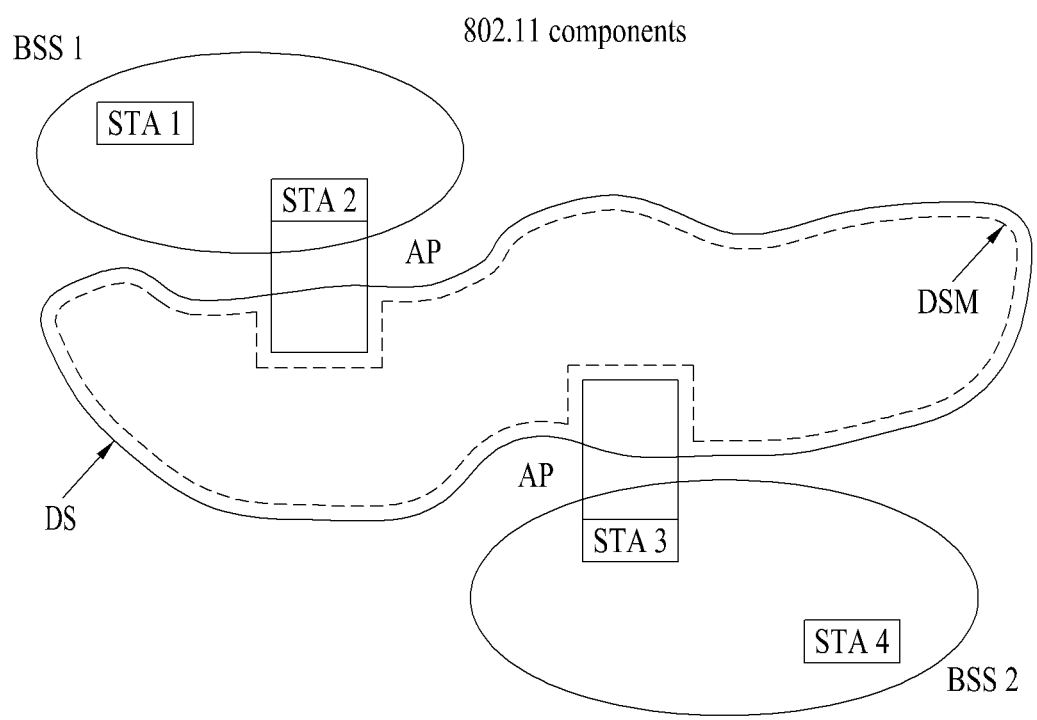
FIG. 2 illustrates another exemplary structure of a WLAN system.

FIG. 2 illustrates another exemplary structure of a WLAN system.

Physical limitations may determine a direct STA-to-STA distance that may be supported. Although, for some networks, this distance is sufficient, for other networks, increased coverage may be required. Thus the BSS may constitute one component of an extended form of a network including multiple BSSs. The architecture structure used to interconnect BSSs is a distribution system (DS).

The DS is a mechanism for connection of a plurality of APs and do not have to be a network. The DS may have any form as long as the DS can provide a given distribution service. For example, the DS may be a wireless network such as a mesh network or a physical structure for connection of APs.

The WLAN system may logically separate a wireless medium (WM) and a distribution system medium (DSM). The respective logical medium is used for different purposes by different components of the architecture. The DS enables provides the logical service required to manage address mapping to destination and seamless integration of multiple BSSs to support the mobility of a device.

An AP is any entity that supports an STA associated therewith to enable the STA to access a distributed system via the WM. Data is transferred between the BSS and the DS via the AP. Here, all APs are also STAs and thus are entities having addresses. However, the addresses used by an AP for communication on the WM and on the DSM are not necessarily the same.

Figure 3:
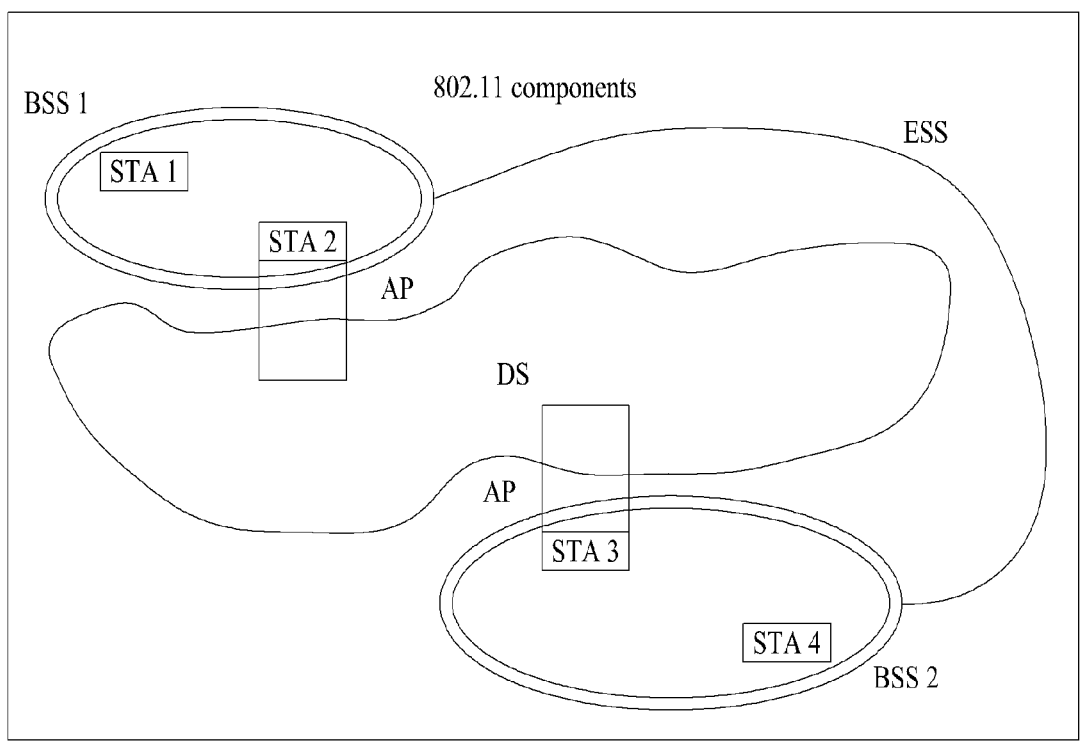
FIG. 3 illustrates another exemplary structure of a WLAN system.

FIG. 3 illustrates another exemplary structure of a WLAN system.

The WLAN system may create a wireless network of arbitrary size and complexity using the DS and the BSS. This type of network is referred to as an extended service set (ESS) network. The ESS refers to a plurality of BSSs connected via the DS and does not include the DS. The ESS network has the same logical link control (LLC) layer as the IBSS network, and thus, STAs belonging to the ESS may move from one BSS to another BSS transparently to the LLC.

The BSSs may partially overlap in order to form physically contiguous coverage. There is no limit to a logical distance between BSSs, and thus, the BSSs may be physically disconnected. In order to avoid unnecessary redundancy, the BSSs may not be physically coupled. In addition, when an ad hoc network operates at a location that also has an ESS network, when physically overlapping WLAN system networks are configured in different organizations, or when a plurality of different access or security policies are needed in the same location, one (or more) IBBSs or ESS networks may be physically present in the same space as one (or more) ESS networks.

Figure 4:
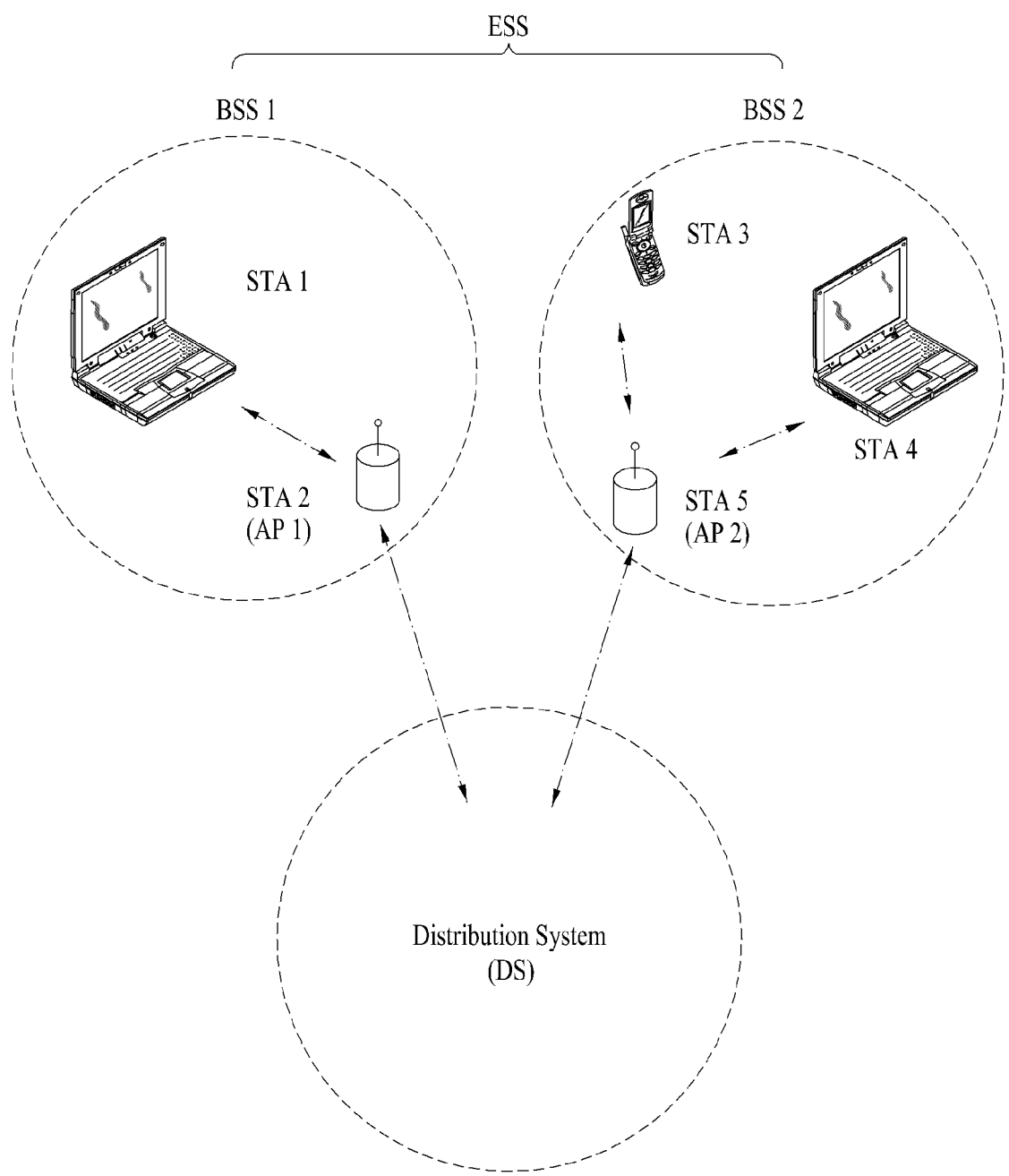
FIG. 4 illustrates another exemplary structure of a WLAN system.

FIG. 4 illustrates another exemplary structure of a WLAN system.

FIG. 4 illustrates an infrastructure BSS including a DS. In FIG. 4, the ESS includes a BSS 1 and a BSS 2. The STA is a logical entity including a physical layer interface for medium access control (MAC) and a WM and includes an AP STA and a non-AP STA. Among STAs, a mobile terminal that is manipulated by a user is the non-AP STA. A simply called STA may refer to the non-AP STA. The non-AP STA may also be called other terms such as a terminal, a wireless transmit/receive unit (WTRU), a user equipment (UE), a mobile station (MS), a mobile subscriber unit, etc. In addition, the AP is an entity that allows a (STA) associated with the AP to access a distribution system (DS) via the WM. The AP may also be called a convergence controller, a base station (BS), a Node-B, a base transceiver system (BTS), a Femto BS, a site controller, etc.

Figure 5:
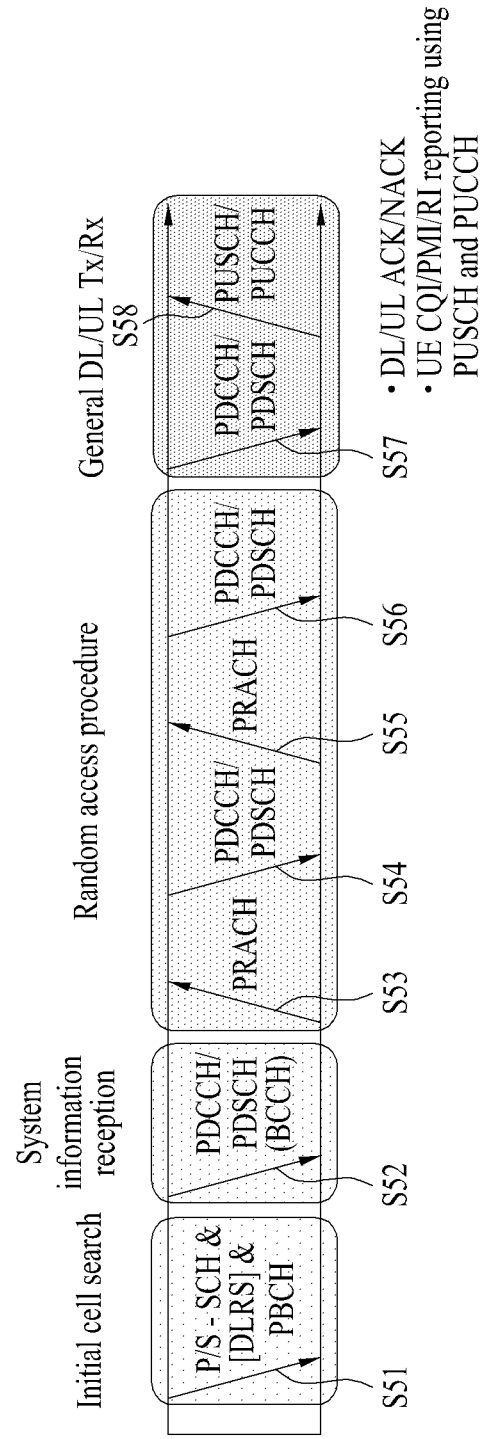
FIG. 5 illustrates physical channels and a general method for transmitting signals on the physical channels in the 3GPP system.

2. Overview of 3GPP LTE/LTE-A System According to the Present Invention 2.1. Overview of System FIG. 5 illustrates physical channels and a general method for transmitting signals on the physical channels in the 3GPP system.

When a UE is powered on or enters a new cell, the UE performs initial cell search (S51). The initial cell search involves acquisition of synchronization to an eNB. Specifically, the UE synchronizes its timing to the eNB and acquires information such as a cell Identifier (ID) by receiving a primary synchronization channel (P-SCH) and a secondary synchronization channel (S-SCH) from the eNB.

Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH (S52).

To complete access to the eNB, the UE may perform a random access procedure with the eNB (S53 to S56). In the random access procedure, the UE may transmit a preamble on a physical random access channel (PRACH) (S53) and may receive a response message to the preamble on a PDCCH and a PDSCH associated with the PDCCH (SS54). In the case of a contention-based random access, the UE may additionally perform a contention resolution procedure including transmission of an additional PRACH (S55) and reception of a PDCCH signal and a PDSCH signal corresponding to the PDCCH signal (S S56).

After the above procedure, the UE may receive a PDCCH and/or a PDSCH from the eNB (S57) and transmit a physical uplink shared channel (PUSCH) and/or a physical uplink control channel (PUCCH) to the eNB (S58), in a general UL/DL signal transmission procedure.

Control information that the UE transmits to the eNB is called UCI. The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In the LTE system, UCI is generally transmitted on a PUCCH periodically. However, if control information and traffic data should be transmitted simultaneously, they may be transmitted on a PUSCH. In addition, UCI may be transmitted aperiodically on the PUSCH, upon receipt of a request/command from a network.

Figure 6:
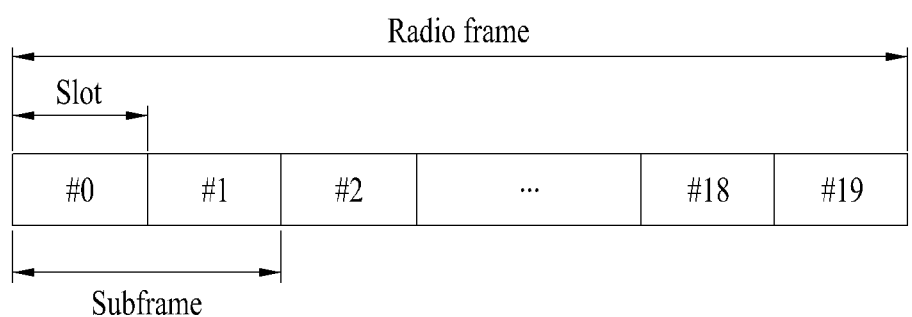
FIG. 6 illustrates a structure of a radio frame used in the LTE system.

FIG. 6 illustrates a structure of a radio frame used in the LTE system.

Referring to FIG. 6, a radio frame includes 10 subframes. Each subframe includes two slots in a time domain. A unit time in which data is transmitted is defined as transmission time interval (TTI). For example, each subframe may be 1 ms long and each slot may be 0.5 ms long.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

The above radio frame structure is purely exemplary. Thus, the number of subframes in a radio frame, the number of slots in a subframe, and the number of OFDM symbols in a slot may be changed in various ways.

Figure 7:
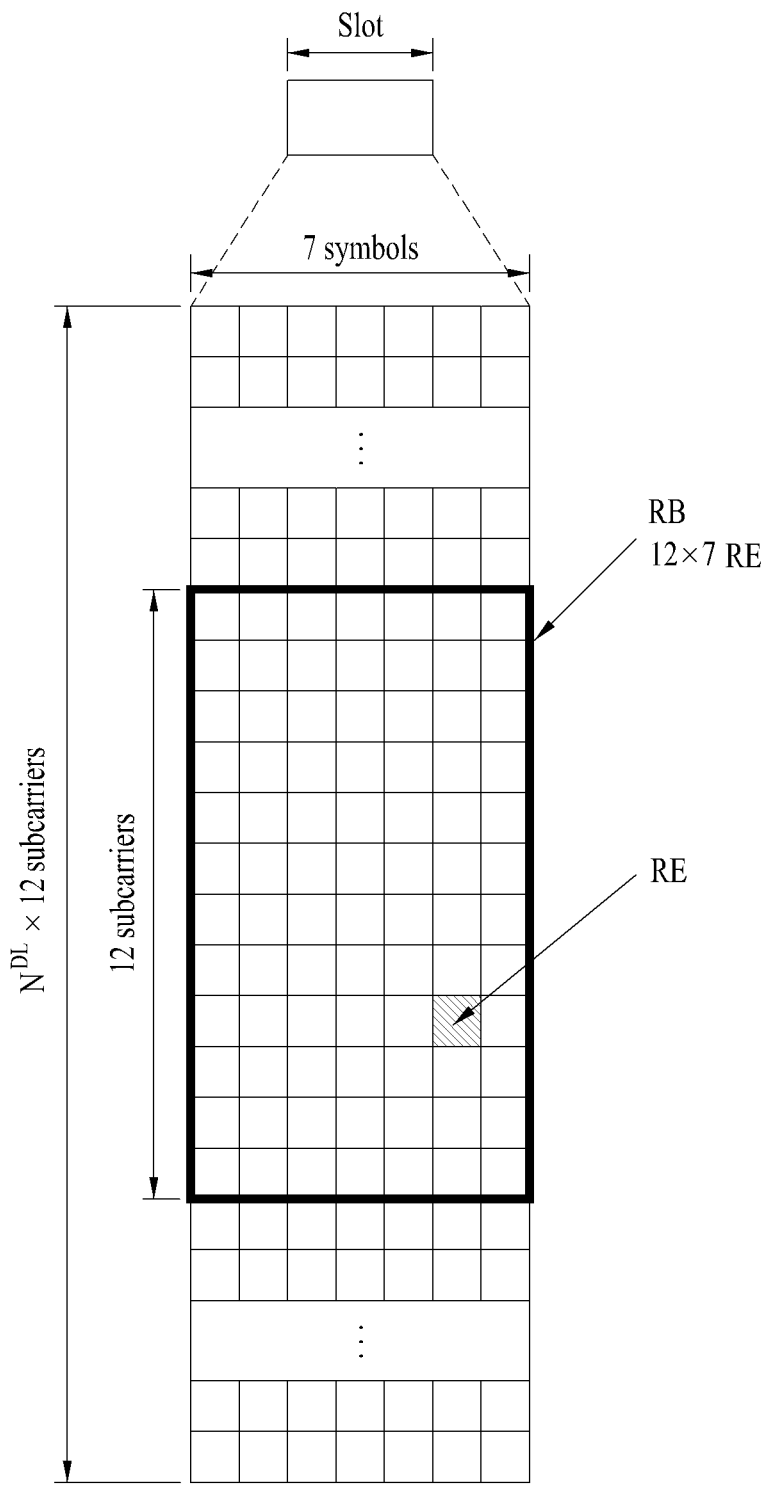
FIG. 7 illustrates an exemplary structure of a DL resource grid for the duration of one DL slot.

FIG. 7 illustrates an exemplary structure of a DL resource grid for the duration of one DL slot.

Referring to FIG. 7, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 8:
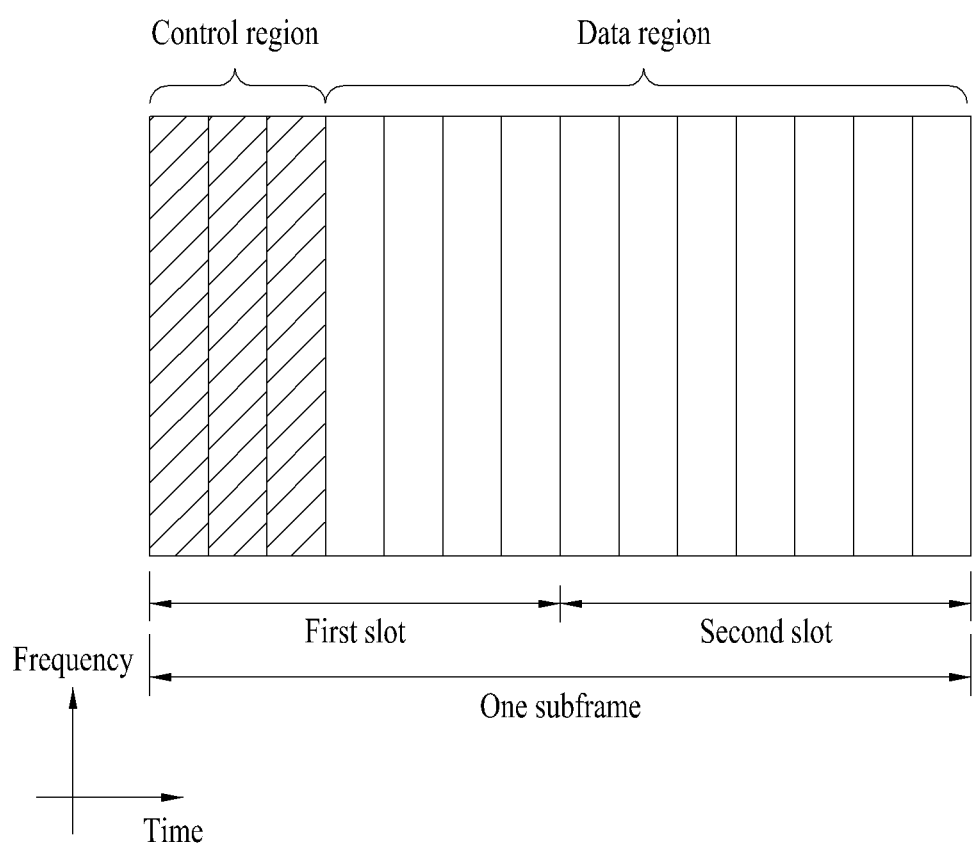
FIG. 8 illustrates a structure of a DL subframe.

FIG. 8 illustrates a structure of a DL subframe.

Referring to FIG. 8, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a physical control format indicator channel (PCFICH), a PDCCH, and a physical hybrid ARQ indicator channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, voice over Internet protocol (VoIP) activation indication information, etc. A plurality of PDCCHs may be transmitted in the control region. A UE may monitor a plurality of PDCCHs. A PDCCH is transmitted in an aggregate of one or more consecutive control channel elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE groups (REGs). The format of a PDCCH and the number of available bits for the PDCCH are determined according to the relationship between the number of CCEs and a code rate provided by the CCEs.

The eNB determines a PDCCH format according to DCI that will be transmitted to the UE and adds a cyclic redundancy check (CRC) to the control information. The CRC is masked by a unique identifier (ID) (e.g. a radio network temporary identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a paging-RNTI (P-RNTI)). If the PDCCH carries system information, particularly, a system information block (SIB), its CRC may be masked by a system information ID (e.g. a system information RNTI (SI-RNTI)). To indicate that the PDCCH carries a random access response to a random access preamble transmitted by a UE, its CRC may be masked by a random access-RNTI (RA-RNTI).

Figure 9:
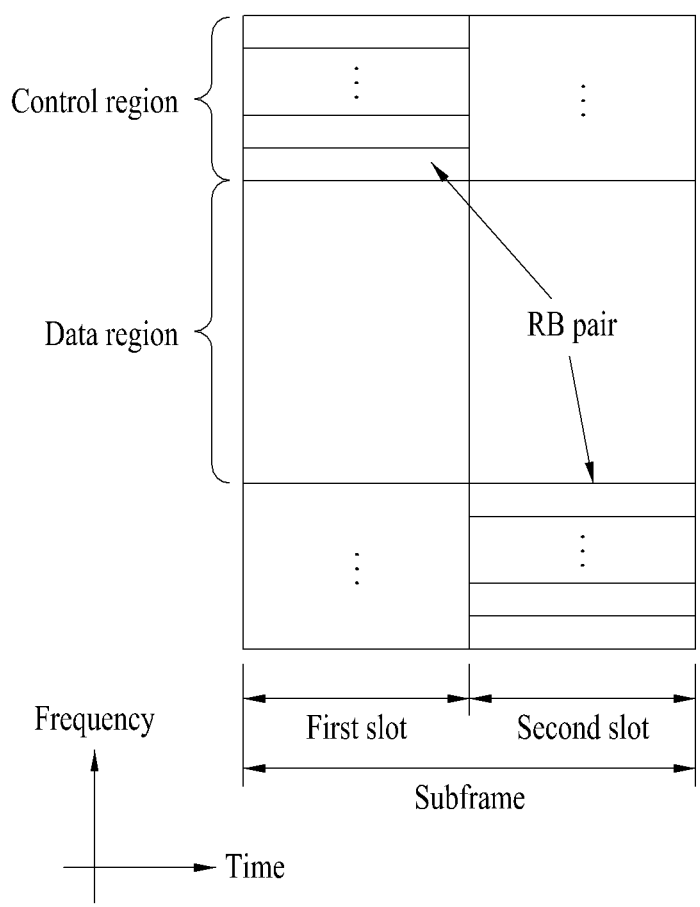
FIG. 9 illustrates a structure of a UL subframe.

FIG. 9 illustrates a structure of a UL subframe.

Referring to FIG. 9, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

2.2. Multi-Input Multi-Output (MIMO)

MIMO uses a plurality of transmission (Tx) antennas and a plurality of reception (Rx) antennas, instead of one Tx antenna and one Rx antenna which have been used thus far. That is, with the use of multiple antennas at a transmitter or a receiver, MIMO can increase capacity and improve performance in a wireless communication system. The term "MIMO" is interchangeable with "multi-antenna".

The MIMO technology does not depend on a single antenna path to receive a total message. Rather, it completes the message by combining data fragments received through a plurality of antennas. In conclusion, MIMO can increase data rate within system coverage and extend system coverage at a given data rate.

The next-generation mobile communication technology requires a higher data transfer rate than that of a conventional mobile communication technology, so that it is expected that the effective MIMO technology is requisite for the next-generation mobile communication technology. Under this assumption, the MIMO communication technology is the next-generation mobile communication technology to be applied to mobile communication terminals or repeaters, and can extend the range of a data communication range, so that it can overcome the limited amount of transfer data of other mobile communication systems due to a variety of limited situations.

In the meantime, the MIMO technology from among a variety of technologies capable of improving the transfer efficiency of data can greatly increase an amount of communication capacity and Tx/Rx performances without allocating additional frequencies or increasing an additional power and have received considerable attention.

Figure 10:
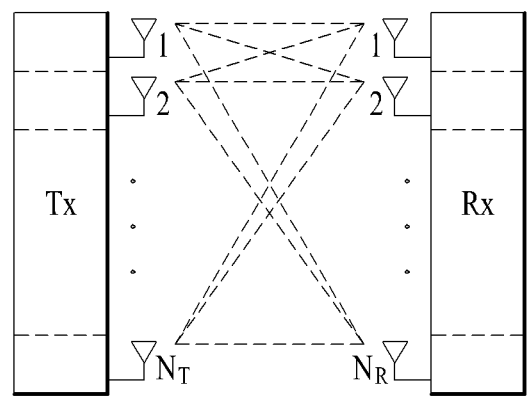
FIG. 10 illustrates the configuration of a typical MIMO communication system.

FIG. 10 illustrates the configuration of a typical MIMO communication system.

Referring to FIG. 10, a transmitter has $N_T$ Tx antennas and a receiver has $N_R$ Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, according to Expression 1 below.

$$R_i = \min(N_T, N_R) \quad \text{[Expression 1]}$$

For instance, a MIMO communication system with four Tx antennas and four Rx antennas may achieve a four-fold increase in transmission rate theoretically, relative to a single-antenna system.

This MIMO antenna technology may be categorized into spatial diversity for improving transmission reliability using symbols passed via various channel paths and spatial multiplexing for improving transmission rate by simultaneously transmitting a plurality of data symbols using a plurality of Tx antennas. Research has been actively conducted on configuration of a hybrid of spatial diversity and spatial multiplexing to appropriately obtain advantages of the aforementioned two schemes.

These schemes will now be described in greater detail.

First, the spatial diversity includes a space-time block coding based method and a space-time Trellis coding method that uses both diversity gain and coding gain. In general, the Trellis coding method is excellent in terms of bit error rate improvement and freedom in code generation but the space-time block coding has low calculation complexity. As this spatial diversity gain, an amount corresponding to the product $N_T \times N_R$ of the Tx antenna number $N_T$ and the Rx antenna number $N_R$ may be obtained.

Second, the spatial multiplexing refers to a method of transmitting different data streams from Tx antennas. In this case, interference may occur in a receiver between data that are simultaneously transmitted from a transmitter. The receiver removes this interference using an appropriate signal processing scheme and then receives the data. The noise removal scheme may include methods using, for example, a maximum likelihood detection (MLD) receiver, a zero-forcing (ZF) receiver, a minimum mean square error (MMSE) receiver, diagonal-Bell laboratories layered space-time (D-BLAST), vertical-bell laboratories layered space-time (V-BLAST), etc. In particular, when the transmitter knows channel information, a singular value decomposition (SVD) method and the like may be used.

Third, the hybrid of the spatial diversity and the spatial multiplexing may be used. When only the spatial diversity gain is obtained, performance improvement gain due to increase in a diversity order is gradually saturated. When only the spatial multiplexing gain is obtained, the transmission reliability in a radio channel is decreased. Research has been conducted into methods for achieving the two gains while overcoming this problem. The methods may include, for example, double-STTD, space time BICM (STBICM), etc.

The communication method of the MIMO system will be described in more detail using mathematical modeling.

As illustrated in FIG. 10, it is assumed that $N_T$ transmit antennas and $N_R$ receive antennas are present.

Regarding a transmission signal, up to $N_T$ pieces of information can be transmitted through the $N_T$ Tx antennas, as expressed as the vector of Expression 2.

$$s = [s_1, s_2, \ldots, s_{N_T}]^T \quad \text{[Expression 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given according to Expression 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Expression 3]}$$

The transmission power-controlled transmission information vector $\hat{s}$ may be expressed according to Expression 4 below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Expression 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined according to Expression 5 below.

$$x = \begin{bmatrix} x_1 \\ x_2 \\ \vdots \\ x_i \\ \vdots \\ x_{N_T} \end{bmatrix} \quad \text{[Expression 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Here, $w_{ij}$ denotes a weight between a $j^{th}$ piece of information and an $i^{th}$ Tx antenna and W is referred to as a weight matrix or a precoding matrix.

In the meantime, the above-mentioned Tx signal (x) can be considered in different ways according to two cases, i.e., a first case in which the spatial diversity is used and a second case in which the spatial multiplexing is used.

When the spatial multiplexing is used, different signals are multiplexed and the multiplexed signals are transmitted to a destination, so that elements of the information vector (s) have different values. On the other hand, when the spatial diversity is used, the same signal is repeatedly transmitted via several channel paths, so that elements of the information vector (s) have the same value.

Needless to say, the combination of the spatial multiplexing scheme and the spatial diversity scheme may also be considered. In other words, for example, the same signal is transmitted via three Tx antennas according to the spatial diversity scheme, and the remaining signals are spatially multiplexed and then transmitted to a destination.

If the $N_R$ receive antennas are present, respective reception signals $y_1, y_2, \ldots, y_{NR}$ of the antennas are expressed as follows.

$$y = [y_1, y_2, \ldots, y_{N_R}]^T \qquad \text{[Expression 6]}$$

If channels are modeled in the MIMO radio communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

The channels may be combined and expressed in the form of a vector and a matrix. A case of the expression in the form of a vector is now described below.

Figure 11:
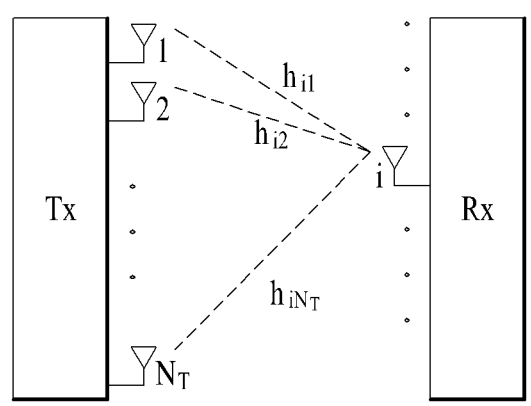
FIG. 11 illustrates channels from the $N_T$ transmit antennas to the receive antenna i.

FIG. 11 illustrates channels from the $N_T$ transmit antennas to the receive antenna i.

As illustrated in FIG. 11, the channels from the $N_T$ transmit antennas to the receive antenna i may be expressed as follows.

$$h_i^T = [h_{i1}, h_{i2}, \ldots, h_{iN_T}] \qquad \text{[Expression 7]}$$

Accordingly, all the channels from the $N_T$ transmit antennas to the $N_R$ receive antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \qquad \text{[Expression 8]}$$

Additive white Gaussian noise (AWGN) is added to the actual channels after a channel matrix H. The AWGN $n_1, n_2, \ldots, n_{N_R}$ added to the $N_T$ transmit antennas may be expressed as follows.

$$n = [n_1, n_2, \ldots, n_{N_R}]^T \qquad \text{[Expression 9]}$$

Through the above-described mathematical modeling of the transmission signals, reception signals, and AWGN, these may be expressed according to the following relationship.

$$y = \begin{bmatrix} y_1 \\ y_2 \\ \vdots \\ y_i \\ \vdots \\ y_{N_R} \end{bmatrix} \qquad \text{[Expression 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_R} \end{bmatrix} + \begin{bmatrix} n_1 \\ n_2 \\ \vdots \\ n_i \\ \vdots \\ n_{N_R} \end{bmatrix}$$

$$= Hx + n$$

The numbers of rows and columns of the channel matrix H indicating the channel state are determined by the number of transmit and receive antennas. The number of rows of the channel matrix H is equal to the number $N_R$ of receive antennas and the number of columns thereof is equal to the number $N_T$ of transmit antennas. That is, the channel matrix H is an $N_R \times N_T$ matrix.

In general, the rank of a matrix is defined as the smaller between the number of independent rows and the number of independent columns in the matrix. Therefore, the rank of the channel matrix is not larger than the number of rows or columns of the channel matrix. The rank of a channel matrix H, rank(H) satisfies the following constraint according to Expression 11 below.

$$\text{rank}(H) \leq \min(N_T, N_R) \qquad \text{[Expression 11]}$$

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

In a description of the present document, a 'rank' for MIMO transmission refers to the number of paths which can independently transmit signals at a specific time point and a specific frequency resource, and 'the number of layers' refers to the number of signal streams transmitted through each path. Generally, since a transmitter transmits layers corresponding in number to ranks used for signal transmission, rank has the same meaning as the number of layers unless particularly mentioned.

2.3. Reference Signal (RS)

In a wireless communication system, data/signals are transmitted on a radio channel and thus the data/signals may be distorted on the radio channel during transmission. To accurately receive the signal successfully, a receiver should compensate for the distortion of the received signal using channel information. To enable the receiver to detect the channel information, a transmitter and a receiver may use an RS known to both the transmitter and the receiver or use channel information using distorted information during transmission of signals through a channel. The aforementioned signal is called a pilot signal or an RS.

In case of data transmission and reception through multiple input/output antennas, knowledge of channel states between Tx antennas and Rx antennas is required for successful signal reception. Accordingly, an RS should exist for each Tx antenna of the transmitter in order to detect a channel state of the receiver.

Downlink RSs are categorized into common RS (CRS) shared among all UEs and dedicated RS (DRS) specific to a specific UE. The transmitter may deliver information for channel measurement and demodulation using these RSs CRS and DRS.

A receiver (i.e. a UE) may feed back a channel quality-related indicator such as a channel quality indicator (CQI), a precoding matrix index (PMI), and/or a rank indicator (RI) to a transmitter (i.e. a BS) by estimating channel states using CRSs. The CRS is also called a cell-specific RS. An RS related to feedback of channel state information (CSI) such as a CQI/PMI/RI may be separately defined as a CSI-RS.

A DRS may be transmitted on a predetermined RE when data transmitted on a PDSCH needs to be demodulated. The UE may be notified whether a DRS exists. The DRS is valid only when a related PDSCH is mapped. The DRS is also called a UE-specific RS or demodulation reference signal (DMRS).

Figure 12:
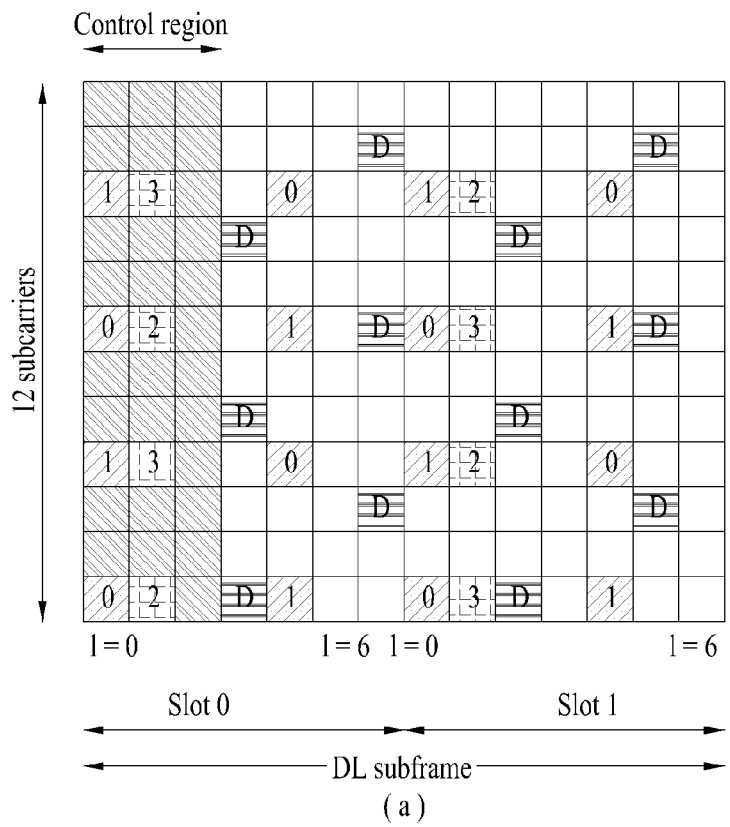
FIG. 12 is a diagram illustrating patterns in which RSs are mapped to a DL RB pair, as defined in a 3GPP LTE.
Figure 12:
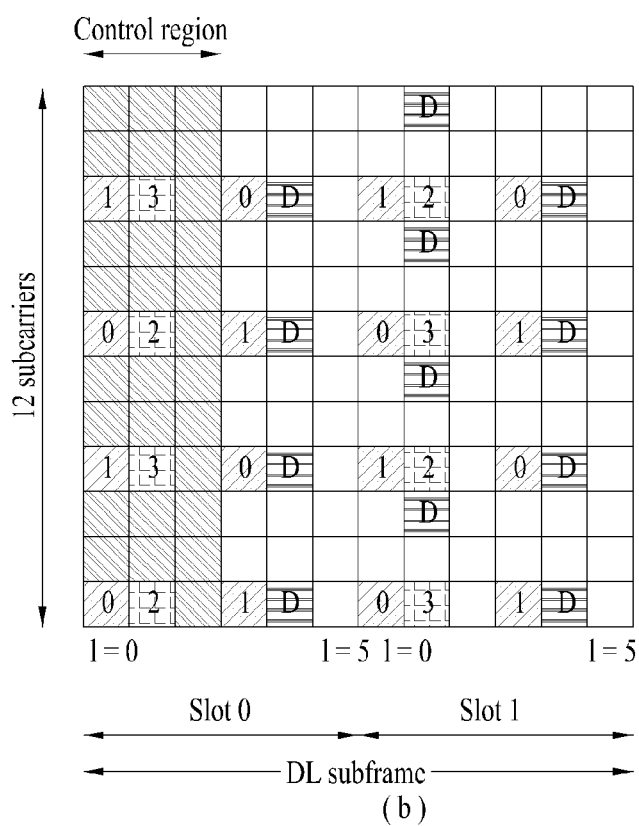

FIG. 12 is a diagram illustrating patterns in which RSs are mapped to a DL RB pair, as defined in a 3GPP LTE.

Referring to FIG. 12, as RS mapping unit, i.e. a DL RB pair may include one subframe in time domain by 12 subcarriers in a time domain. That is, one RB pair has a length of 14 OFDM symbols on a time axis in the case of a normal cyclic prefix (CP) (see FIG. 12(a)) and 12 OFDM symbols on a time axis in the case of an extended CP (see FIG. 12(b)). REs labeled with '0', '1', '2' and '3' in each RB are REs to which CRSs corresponding to antenna ports '0', '1', '2', and '3' of a transmitter (e.g., a BS) and REs labeled with 'D' denote REs to which a DRS is mapped.

The CRS will be described below in detail. CRSs may be common to all UEs within a cell, distributed across a total frequency band, and used for estimating channels of physical antenna ends. The CRSs may serve the purpose of CSI acquisition and data demodulation.

CRSs are defined in various formats depending on the antenna configuration of a transmitter (e.g., a BS). A 3GPP LTE system (which conforms to, for example, Release-8) supports various antenna configurations and a DL signal transmitter has three types of antenna configurations such as three single Tx antennas, two Tx antennas, and four Tx antennas. When a BS uses a single Tx antenna, RSs for a single antenna port are aligned. When the BS uses two Tx antennas, RSs for two Tx antenna ports are aligned via time division multiplexing (TDM) and/or frequency division multiplexing (FDM). That is, in order to differentiate RSs for two antenna ports, different time resources and/or different frequency resources are allocated. In addition, when the BS uses four Tx antennas, RSs for two Tx antenna ports are aligned via TDM and/or FDM. Channel information measured by a receiver (UE) of a DL signal may be used to demodulate data transmitted via a transmission method such as single Tx antenna transmission, transmission diversity, closed-loop spatial multiplexing, open-loop spatial multiplexing, or multi-user MIMO.

When a multiple input/output antenna is supported, if an RS is transmitted from a specific antenna port, the RS is transmitted to locations of REs specified according to patterns of the RS and is not transmitted to locations of REs specified for other antenna ports. That is, RSs between different antennas do not overlap.

Rules for mapping CRS to resource blocks are defined according to Expression 12 below.

$$k = 6m + (v + v_{shift}) \bmod 6 \qquad \text{[Expression 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Expression 12 above, k and l denote a subcarrier index and a symbol index, respectively and p denotes an antenna port. $N_{symb}^{DL}$ denotes the number of OFDM symbols in one DL slot and $N_{RB}^{DL}$ denotes the number of radio resources allocated to DL. $n_s$ denotes a slot index and $N_{ID}^{cell}$ denotes an ID. mod refers to modulo calculation. An RS position depends on $V_{shift}$ in the frequency domain. Since $V_{shift}$ depends on the cell ID, the RS position has various frequency shifts according to cells.

In more detail, in order to improve channel estimation performance via a CRS, a location of the CRS may be shifted in the frequency domain according to cells. For example, when RSs are spaced apart by an interval corresponding to two subcarriers, RSs in) one cell are allocated to a $3k^{th}$ subcarrier and an RS in another cell is allocated to a $(3k+1)^{th}$ subcarrier. In terms of one antenna port, RSs are spaced apart in the frequency domain by an interval corresponding to six REs and are spaced part from an RS allocated to another antenna port at an interval corresponding to three REs.

RSs in the time domain are aligned at a constant interval, starting from a symbol index 0 of each slot. A time interval is defined in different ways according to a CP length. In the case of the normal CP, an RS is located at symbol indexes 0 and 4 of a slot. In the case of the extended CP, an RS is located at symbol indexes 0 and 3 of a slot. An RS for an antenna port with a largest value of two antenna ports is defined in one OFDM symbol. Thus, in case of four Tx antenna transmission, RSs for RS antenna ports 0 and 1 are located at symbol indexes 0 and 4 (symbol indexes 0 and 3 in case of the extended CP) of a slot and RSs for antenna ports 2 and 3 are located at a symbol index 1 of a slot. Locations of RSs for antenna ports 2 and 3 in the frequency domain are exchanged in a second slot.

A DRS will now be described in greater detail. The DRS is used to demodulate data. A precoding weight used for a specific UE in multiple input/output antenna transmission is combined with a transmission channel transmitted from each Tx antenna and used to estimate the corresponding channel without change when the UE receives an RS.

A 3GPP LTE system (which conforms to, for example, Release-8) supports a maximum of 4 Tx antennas and defines a DRS for rank 1 beamforming. The DRS for rank 1 beamforming indicates an RS for an antenna port index 5.

A rule for mapping a DRS to a resource block is defined as follows. Expression 13 below represents a case of normal CP and Expression 14 below represents a case of extended CP.

$$k = (k') \bmod N_{sc}^{RB} + N_{sc}^{RB} \cdot n_{PRB} \quad \text{[Expression 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Expression 14]}$$

$$k' = \begin{cases} 3m' + v_{shift} & \text{if } l \in 4 \\ 3m' + (2 + v_{shift}) \bmod 3 & \text{if } l \in 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Expressions 12 to 14, k and p denote a subcarrier index and an antenna port. $N_{RB}^{DL}$, and $N_{cell}^{ID}$ denote the number of RBs allocated for DL, the number of slot indexes, and the number of cell IDs. An RS position depends on $V_{shift}$ in the frequency domain.

In Expressions 13 and 14, k and l denote a subcarrier index and a symbol index, respectively and p denotes an antenna port. $N_{SC}^{RB}$ denotes the size of a resource block in the frequency domain and is expressed as the number of subcarriers. $n_{PRB}$ denotes the number of physical resource blocks. $N_{RB}^{PDSCH}$ denotes a frequency band of a resource block for cell PDSCH transmission. $n_s$ denotes a slot index and $N_{ID}^{cell}$ denotes a cell ID. mod refers to modulo calculation. An RS signal position depends on $V_{shift}$ in terms of a frequency domain. Since $V_{shift}$ depends on a cell ID, the RS position has various frequency shifts according to cells.

2.4. Coordinated Multi-Point Transmission and Reception (CoMP)

To satisfy requirements for the LTE-A system, a CoMP transmission scheme has been proposed. CoMP is also referred to as co-MIMO, collaborated MIMO, or network MIMO. CoMP is devised to increase the performance of UEs located at a cell edge and average sector throughput.

Generally, inter-cell interference (ICI) degrades the performance of a UE at a cell edge and average sector throughput in a multi-cell environment with a frequency reuse factor of 1. To offer an appropriate throughput performance to a cell-edge UE in an environment constrained by interference while reducing ICI, a simple technique (e.g. UE-specific power control-based Fractional Frequency Reuse (FFR)) may be applied to the LTE-A system. However, it is more effective to reduce ICI or reuse CI as a desired signal, rather than to decrease the utilization of frequency resources per cell. To achieve the aforementioned objective, a CoMP transmission scheme may be applied.

Downlink CoMP schemes may be classified into joint processing (JP), and coordinated scheduling/beamforming (CS/CB).

According to the JP scheme, data can be used at each point (eNB) in a CoMP cooperating set. The CoMP cooperating set refers to a set of eNBs used in the CoMP scheme. The JP scheme may be classified into a joint transmission scheme and a dynamic cell selection scheme.

In the joint transmission scheme, signals are simultaneously transmitted on a PDSCH that is a part or entire of CoMP cooperating set, from multiple points. That is, data transmitted to a single UE may be simultaneously transmitted from multiple transmission points. According to the joint transmission scheme, the quality of signals transmitted to the UE may be improved coherently or non-coherently and interference with other UEs may be actively removed.

In the dynamic cell selection scheme, signals are transmitted on a PDSCH from one point within the CoMP cooperating set. That is, data transmitted to a single UE at a specific point of time is transmitted from one point and is not transmitted to the UE at another point within the CoMP cooperating set. A point for transmitting data to the UE may be dynamically selected.

In the CS/CB scheme, while only a serving cell transmits data to the UE, user scheduling/beamforming selection may be determined through coordination among cells of the CoMP cooperation set.

Uplink CoMP reception refers to reception of transmission signals through cooperation among a plurality of geographically separate points. Uplink CoMP schemes may be divided into Joint Reception (JR), and Coordinated Scheduling/Beamforming (CS/CB).

In JR, a plurality of reception points receives a PUSCH signal. In CS/CB, while only one point receives a PUSCH signal, user scheduling/beamforming is determined through coordination among cells of a CoMP cooperation set.

2.5. Sounding Reference Signal (SRS)

An SRS is mainly used for channel quality estimation in order to enable frequency-selective scheduling on UL and is associated with transmission of UL data and/or control information, to which the present invention is not limited. The SRS may be used for other various purposes such as to enhance power control or to support various start-up functions for UEs that are not recently scheduled. Examples of the start-up function may include initial modulation and coding scheme (MCS), initial power control for data transmissions, timing advance, and frequency semi-selective scheduling. In this case, the frequency semi-selective scheduling refers to scheduling in which frequency resource is assigned selectively for a first slot of a subframe and hops pseudo-randomly to another frequency in a second slot.

In addition, the SRS may be used for DL channel quality estimation on the assumption that a wireless channel is reciprocal between UL and DL. This assumption is especially valid in a time division duplex (TDD) system where the uplink and downlink share the same frequency spectrum and are separated in a time domain.

Subframes in which the SRS is transmitted from any UE within the cell are indicated by cell-specific broadcast signaling. A 4-bit cell-specific 'srsSubframeConfiguration' parameter indicates 15 possible sets of subframes in which the SRS may be transmitted within each radio frame. This configurability provides flexibility by adjusting SRS overhead depending on a deployment scenario. A $16^{th}$ configuration switches the SRS off completely in the cell, which may be appropriate for a cell serving primarily high-speed UEs.

Figure 13:
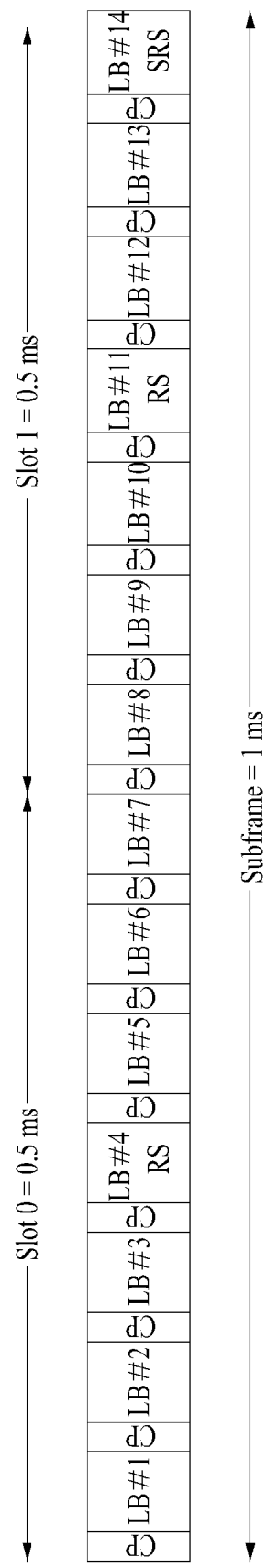
FIG. 13 illustrates an uplink subframe including an SRS symbol.

FIG. 13 illustrates an uplink subframe including an SRS symbol.

Referring to FIG. 13, the SRS is always transmitted through a last SC-FDMA symbol on a configured subframe. Thus, the SRS and the DMRS are positioned in another SC-FDMA symbol. PUSCH data transmission is not allowed on the SC-FDMA symbol designated for SRS transmission, resulting in sounding overhead of about 7% even if an SRS symbol is included in all subframes.

Each SRS symbol is generated by basis sequences (random sequence or ZC-based sequence set) for a given time unit and a frequency band, in which all UEs in the same cell use the same basis sequence. In this case, SRN transmission from multiple UEs in the same cell in the same frequency and time is distinguished orthogonally by different cyclic shifts of the basis sequence. SRS sequences from different cells may be distinguished by assigning different basis sequences in different cells but orthogonality is not guaranteed between different basis sequences.

2.6. Relay Node (RN)

An RN may transmit data transmitted between a BS and a UE through two different links (backhaul link and access link). The BS may include a donor cell. The RN is wirelessly connected to a radio access network via the donor cell.

In regard to an RN's use of a frequency band (or spectrum), its operation can be classified into in-band and out-band. For an in-band RN, a backhaul link shares the same frequency band with an access link. If the backhaul link and the access link operate in different frequency bands, the RN is an out-band RN. In both in-band and out-band relaying, a UE (legacy UE) operating in the conventional LTE system (e.g. Release-8) should be able to access a donor cell.

Depending on whether a UE is aware of the existence of an RN, RNs may be classified into a transparent RN and a non-transparent RN. If the UE does not perceive whether it communicates with a network via an RN, the RN is a transparent RN. In contrast, if the UE perceives whether it communicates with a network via an RN, the RN is a non-transparent RN.

In relation to control of RNs, RNs may be classified into an RN configured as a part of a donor cell and an RN that self-controls a cell.

The former RN may have an RN ID, although it does not have its own cell ID. If at least a part of Radio Resource Management (RRM) of an RN is controlled by an eNB covering the donor cell, the RN is regarded as configured as a part of the donor cell (even though the other parts of the RRM reside in the RN). Preferably, this RN can support legacy UEs. For instance, smart repeaters, decode-and-forward relays, various types of L2 RNs, and type-2 RNs form a part of a donor cell.

The latter RN controls one or more cells. The cells are allocated their unique physical cell IDs and they may use the same RRM mechanism. From the viewpoint of a UE, there is no distinction between accessing a cell controlled by an RN and accessing a cell controlled by a macro eNB. Preferably, a cell controlled by this type of RN may support legacy UEs. For example, RNs of this type include self-backhauling RNs, L3 RNs, type-1 RNs, and type-1a RNs.

A type-1 RN is an in-band RN that controls a plurality of cells. Each of the plurality of cells appears to a UE as a separate cell distinct from a donor cell. The plurality of cells have their own physical cell IDs (as defined in LTE Release-8) and the RN can transmit its own synchronization channels, RSs, etc. During a single-cell operation, a UE may receive scheduling information and an HARQ feedback directly from the RN and transmit its control channels (an SR, a CQI, an ACK/NACK, etc.) to the RN. The type-1 RN appears as a legacy eNB (operating in conformance to LTE Release-8) to a legacy UE (conforming to LTE Release-8). That is, the type-1 RN has backward compatibility. On the other hand, to LTE-A UEs, the type-1 RN appears different from a legacy eNB. Thus the type-1 RN can enhance performance.

Except for its out-band operation, a type-1a RN is characterized by the same set of features as the type-1 RN. The type-1a RN may be configured such that the influence of its operation on an L1 operation is minimized or eliminated.

A type-2 RN is an in-band RN that does not have its own physical cell ID and thus does not form a new cell. Since the type-2 RN is transparent to legacy UEs, the legacy UEs do not notice the existence of the type-2 RN. The type-2 RN can transmit a PDCCH but does not transmit at least a Common RS (CRS) and a PDCCH.

In order to allow in-band relaying, some resources in the time-frequency domain should be set aside for a backhaul link and these resources may be set not to be used for an access link. This is called resource partitioning.

A description will be given of the general principle of resource partitioning at an RN. A backhaul downlink and an access downlink may be Time Division Multiplexing (TDM)-multiplexed in one carrier frequency (that is, only one of the backhaul downlink and the access downlink is activated at a specific time). Similarly, a backhaul uplink and an access uplink may be TDM-multiplexed in one carrier frequency (that is, only one of the backhaul uplink and the access uplink is activated at a specific time).

Multiplexing of backhaul links in FDD is performed such that backhaul downlink transmission and backhaul uplink transmission take place in a downlink frequency band and an uplink frequency band, respectively. In comparison, multiplexing of backhaul links in TDD is performed such that backhaul downlink transmission and backhaul uplink transmission take place in a downlink subframe between an eNB and an RN and an uplink subframe between the eNB and the RN, respectively.

In the case of an in-band RN, for example, if backhaul downlink reception from an eNB and access downlink transmission to a UE are performed simultaneously in the same frequency band, a signal transmitted from the transmitter of the RN may be received at the receiver of the RN. As a result, signal interference or Radio Frequency (RF) jamming may occur at the RF front-end of the RN. Likewise, if access uplink reception from a UE and backhaul uplink transmission to an eNB take place simultaneously in the same frequency band, the RF front-end of the RN may experience signal interference.

Therefore, simultaneous eNB-to-RN and RN-to-UE transmissions in the same frequency band may not be feasible unless a reception signal and a transmission signal are sufficiently isolated from each other (e.g. a transmission antenna is geographically apart enough from a reception antenna (e.g. on the ground/underground)).

One way to handle the signal interference is to operate the RN such that while the RN is receiving a signal from a donor cell, it is not transmitting signals to UEs. That is, a gap is created in the RN-to-UE transmission and UEs (including legacy UEs) are not supposed to expect any RN transmission during the gap. This gap may be created by configuring a Multicast Broadcast Single Frequency Network (MBSFN) subframe.

Figure 14:
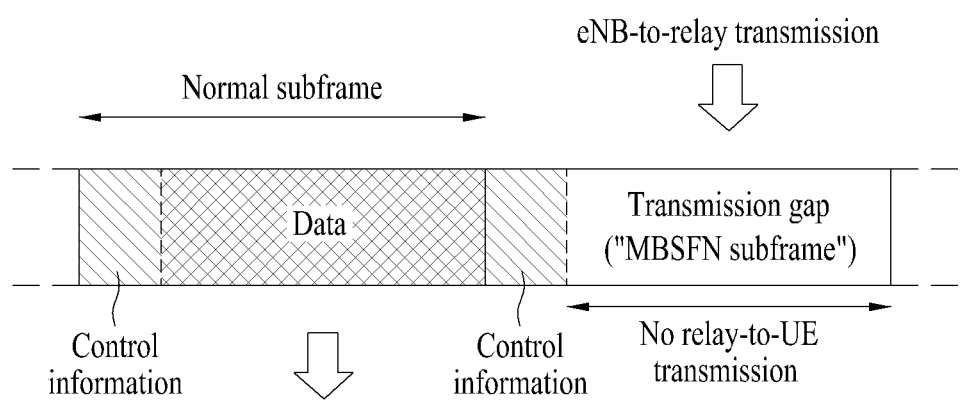
FIG. 14 is a diagram illustrating an example of RN relay partitioning.

FIG. 14 is a diagram illustrating an example of RN relay partitioning.

In FIG. 14, a first subframe is a general subframe in which an RN transmits a downlink (i.e. an access downlink) control signal and data to a UE and a second subframe is an MBSFN subframe in which an RN transmits a control signal to a UE in the control region of a DL subframe but no transmission occurs from an RN to a UE in the other region of the DL subframe. Since a legacy UE expects PDCCH transmission in every DL subframe (in other words, an RN needs to allow legacy UEs within its area to receive a PDCCH in each subframe and thus support a measurement function), it is necessary to transmit a PDCCH in every DL subframe to ensure reliable operations of legacy UEs. Therefore, the RN needs access downlink transmission in the first N (N=1, 2 or 3) OFDM symbols of even a subframe (a second subframe 1020) configured for downlink (i.e. backhaul downlink) transmission from an eNB to the RN, instead of backhaul downlink reception. Since the RN transmits a PDCCH to UEs in the control region of the second subframe, backward compatibility may be provided to legacy UEs served by the RN. The RN may receive a signal from the eNB in the remaining region of the second subframe in which no transmission occurs from the RN to UEs. Thus, an in-band RN does not perform access downlink transmission and backhaul downlink reception simultaneously by the above-described resource partitioning.

The second subframe using an MBSFN subframe will be described in detail. The control region of the second subframe may be referred to as an RN non-hearing interval. An RN transmits an access downlink signal without receiving a backhaul downlink signal in the RN non-hearing interval. The RN non-hearing interval may have 1, 2 or 3 OFDM symbols. The RN may transmit an access downlink signal to a UE in the RN non-hearing interval and receive a backhaul downlink signal from an eNB in the other interval. Since the RN cannot perform transmission and reception simultaneously in the same frequency band, time is taken for the RN to switch from Transmission (Tx) mode to Reception (Rx) mode. Therefore, a Guard Time (GT) needs to be set in a starting part of the backhaul downlink reception area, for Tx/Rx mode switching of the RN. Similarly, when the RN receives a backhaul downlink signal from the eNB and transmits an access downlink signal to a UE, a GT may be set for Rx/Tx mode switching of the RN. The length of a GT may be a time-domain value, for example, k (k≥1) time samples ($T_s$) or one or more OFDM symbols. Or when RN backhaul downlink subframes are successively configured or according to a predetermined subframe timing alignment relationship, a GT may not be defined or set at the end of a subframe. To maintain backward compatibility, a GT may be defined only in a frequency area set for backhaul downlink subframe transmission (if a GT is set in an access downlink period, legacy UEs cannot be supported). The RN may receive a PDCCH and a PDSCH from the eNB in the backhaul downlink reception period except for the GT. The PDCCH and PDSCH may be called an R-PDCCH and an R-PDSCH to indicate that they are RN dedicated physical channels.

2.7. Carrier Aggregation (CA) Environment 2.7.1. Overview of CA

A communication environment considered according to embodiments of the present invention includes all multi-carrier support environments. That is, a multi-carrier system or a CA system refers to a system obtained by aggregating one or more component carriers (CCs) with a bandwidth smaller than a target bandwidth for configuration of a target wide band in order to support a wide band.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system. For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources. For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells is configured for the UE, a CA environment using more UL CCs than DL CCs may also be supported. That is, CA may be regarded as aggregation of two or more cells having different carrier frequencies (center frequencies). Herein, the term 'cell' should be distinguished from 'cell' as a geographical area covered by an eNB.

In the LTE-A system, a Primacy Cell (PCell) and a Secondary Cell (SCell) are defined. The PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. The SCell may refer to a cell operating in a secondary frequency (or a secondary CC). Although only one PCell is allocated to a specific UE, one or more SCells may be allocated to the UE. An Scell may be configured after RRC connection establishment and may be used to provide additional radio resources. There is no PUCCH in cells other than a PCell, that is, in SCells among serving cells configured in the CA environment.

Hereinafter, a primary CC (PCC) and a PCell may be used in the same meaning and a secondary CC (SCC) and an SCell may be used in the same meaning in embodiments of the present invention.

Figure 15:
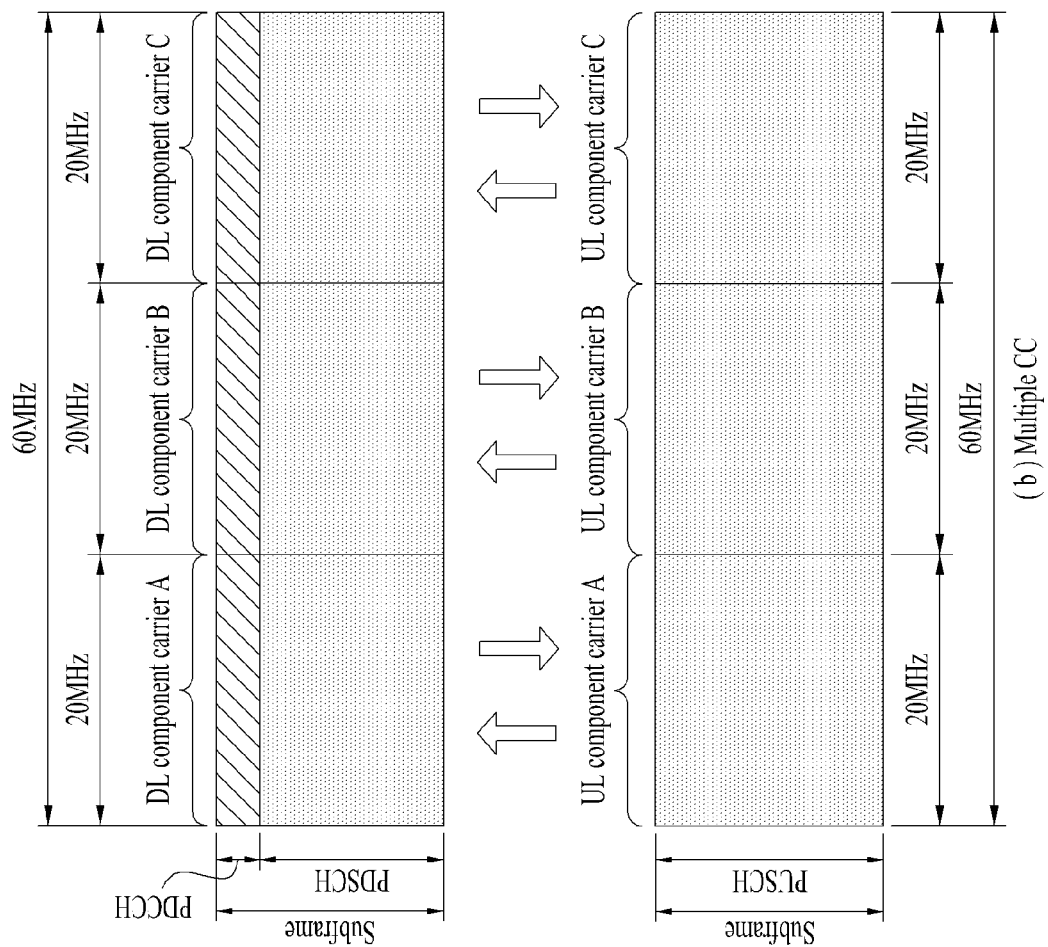
FIG. 15 illustrates an example of CCs of an LTE system and CA in the LTE-A system.
Figure 15:
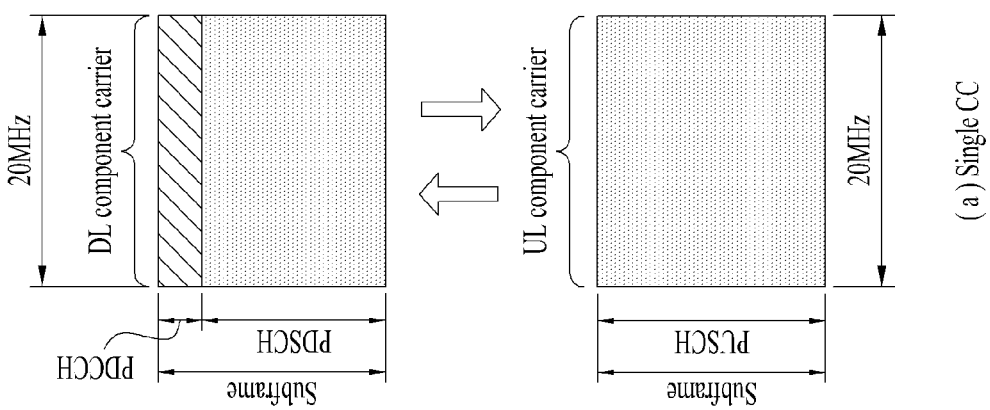

FIG. 15 illustrates an example of CCs of an LTE system and CA in the LTE-A system.

FIG. 15(a) illustrates a single carrier structure in the LTE system. There are a DL CC and a UL CC and one CC may have a frequency range of 20 MHz.

FIG. 15(b) illustrates a CA structure in the LTE-A system. In the illustrated case of FIG. 15(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by a system information block type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.7.2. Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a carrier indicator field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 16:
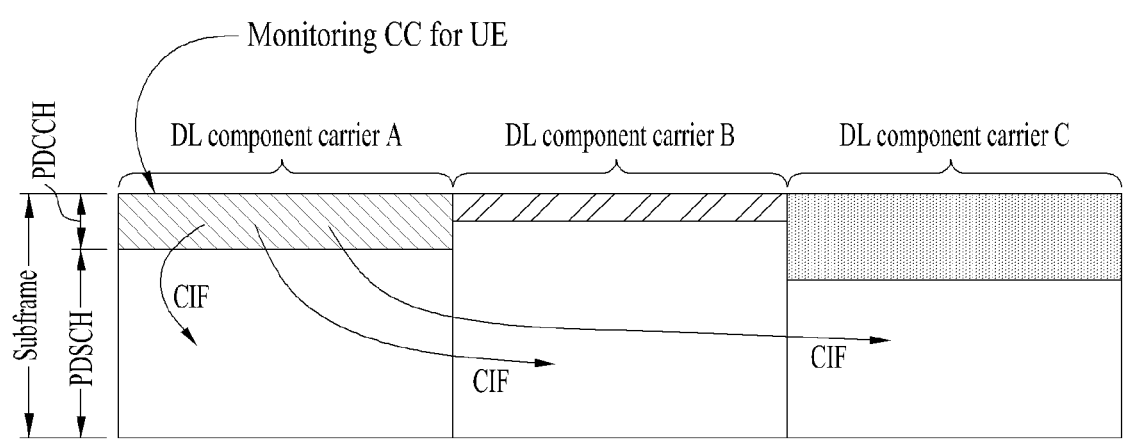
FIG. 16 illustrates a cross carrier-scheduled subframe structure in the LTE-A system.

FIG. 16 illustrates a cross carrier-scheduled subframe structure in the LTE-A system.

Referring to FIG. 16, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. Method of Controlling Transmission Power of UE

The present invention relates to a method of controlling contiguous channel interference via out-of-band emission power of a receiver in order to minimize performance degradation due to interference of a receiver of a system located in a adjacent band when an LTE/LTE-A UE operates in a transmission mode.

According to demands for a wide bandwidth due to a recent dramatic increase in data use, it is expected that a higher number of new frequency bands are allocated and accordingly coexistence problems between adjacent bands in terms of interference have seriously arisen. It is difficult to resolve most interference problem due to the characteristics of RF devices used in a UE. Accordingly, a 3GPP LTE/LTE-A system uses an NS_xx type of network signaling and an A-MPR table associated therewith for basic interference control for coexistence between adjacent bands.

A method of controlling transmission power of a UE of legacy LTE is now described in greater detail. Maximum transmission power of the UE is determined according to a power class to which the UE belongs. However, the legacy LTE does not use maximum transmission power corresponding to the power class of the UE and allows additional power reduction according to a modulation order of a baseband end during transmission, an RB size, or a type of an operating band to which the UE belongs. The additional power reduction is controlled using maximum power reduction (MPR), or additional MPR (A-MPR). When data to be transmitted is within ±4 MHz of an operating band, additional power reduction of 1.5 dB is allowed for band edge relaxation. The MPR allows power reduction of 1 dB or 2 dB according to a modulation order of the UE irrespective of a frequency band.

The A-MPR is additional power reduction added to the MPR and is determined according to a 3GPP band or geographical characteristics. In detail, the A-MPR of a corresponding band is determined according to a type of network signaling (NS) included in system information block2 broadcast in a cell. That is, when a BS determines existence of a system using a adjacent band to be protected in an area of the corresponding BS, the BS transmits NS_xx allocated in a corresponding band through 'additionalSpectrumEmission' that is a subfield of a field 'freqInfo' on the SIB2 in order to reduce interference due to unnecessary emission of the UE with respect to adjacent bands.

Table 1 below shows A-MPR.

TABLE 1

| Network Signalling value | Requirements (subclause) | E-UTRA Band | Channel bandwidth (MHz) | Resources Blocks ($N_{RB}$) | A-MPR (dB) |
|---|---|---|---|---|---|
| NS_01 | 6.6.2.1.1 | E-UTRA operating bands | 1.4, 3, 5, 10, 15, 20 | 6, 15, 25, 50, 75, 100 | NA |
| NS_03 | 6.6.2.2.1 | 2, 4, 10, 23, 25, 35, 36 | 3 | >5 | ≤1 |
|  |  |  | 5 | >6 | ≤1 |
|  |  |  | 10 | >6 | ≤1 |
|  |  |  | 15 | >8 | ≤1 |
|  |  |  | 20 | >10 | ≤1 |
| NS_04 | 6.6.2.2.2 | 41 | 5 | >6 | ≤1 |
|  |  |  | 10, 15, 20 |  | ⌗ 2 |
| NS_05 | 6.6.3.3.1 | 1 | 10, 15, 20 | ≥50 | ≤1 |
| NS_06 | 6.6.2.2.3 | 12, 13, 14, 17 | 1.4, 3, 5, 10 | 6, 15, 25, 50, 75, 100 | n/a |
| NS_07 | 6.6.2.2.3 6.6.3.3.2 | 13 | 10 | ⌗ 3 | ⌗ 3 |
| NS_08 | 6.6.3.3.3 | 19 | 10, 15 | >44 | ≤3 |
| NS_09 | 6.6.3.3.4 | 21 | 10, 15 | >40 | ≤1 |
|  |  |  |  | >55 | ≤2 |
| NS_10 |  | 20 | 15, 20 | ⌗ 4 | ⌗ 4 |
| NS_11 | 6.6.2.2.1 | 23[1] | 1.4, 3, 5, 10 | ⌗ 5 | ⌗ 5 |
| ... |  |  |  |  |  |
| NS_32 | — | — | — | — | — |

NOTE 1:
Applies to the lower block of Band 23, i.e. a carrier placed in the 2000-2010 MHz region.

Table 2 below shows A-MPR according to NS_04.

TABLE 2

| Channel BW | Parameters | Region A | Region B | Region C |
|---|---|---|---|---|
| 10 | $RB_{start}$ | 0-12 | 13-36 | 37-49 |
|  | $RB_{start} + L_{CRB}$ [RBs] | n/a[3] | >37 | n/a[3] |
|  | A-MPR [dB] | ≤3 dB | ≤2 dB | ≤3 dB |
| 15 | $RB_{start}$ | 0-18 | 19-55 | 56-74 |
|  | $RB_{start} + L_{CRB}$ [RBs] | n/a[3] | >56 | n/a[3] |
|  | A-MPR [dB] | ≤3 dB | ≤2 dB | ≤3 dB |
| 20 | $RB_{start}$ | 0-24 | 25-74 | 75-99 |
|  | $RB_{start} + L_{CRB}$ [RBs] | n/a[3] | >75 | n/a[3] |
|  | A-MPR [dB] | ≤3 dB | ≤2 dB | ≤3 dB |

NOTE 1:
$RB_{start}$ indicates the lowest RB index of transmitted resource blocks NOTE 2:
$L_{CRB}$ is the length of a contiguous resource block allocation NOTE 3:
[3] refers to any RB allocation that starts in Region A or C is allowed the specified A-MPR NOTE 4:
For intra-subframe frequency hopping which intersects regions, notes 1 and 2 apply on a per slot basis NOTE 5:
For intra-subframe frequency hopping which intersects regions, the larger A-MPR value may be applied for both slots in the subframe Table 3 below shows A-MPR according to NS_07.

TABLE 3

| Parameters | Region A | | Region B | | Region C |
|---|---|---|---|---|---|
| $RB_{start}$ | 0-12 | | 13-18 | 19-42 | 43-49 |
| $L_{CRB}$ [RBs] | 6-8 | 1 to 5 and 9-50 | ≥8 | ≥18 | ≤2 |
| A-MPR [dB] | ≤8 | ≤12 | ≤12 | ≤6 | ≤3 |

NOTE 1:
$RB_{start}$ indicates the lowest RB index of transmitted resource blocks
NOTE 2:
$L_{CRB}$ is the length of a contiguous resource block allocation
NOTE 3:
For intra-subframe frequency hopping between two regions, notes 1 and 2 apply on a per slot basis.
NOTE 4;
For intra-subframe frequency hopping between two regions, the larger A-MPR value of the two regions may be applied for both slots in the subframe.

Table 4 below shows A-MPR according to NS_10.

TABLE 4

| Channel BW | Parameters | Region A |
|---|---|---|
| 15 | $RB_{start}$ | 0-10 |
| | $L_{CRB}$ [RBs] | 1-20 |
| | A-MPR [dB] | ≤2 |
| 20 | $RB_{start}$ | 0-15 |
| | $L_{CRB}$ [RBs] | 1-20 |
| | A-MPR [dB] | ≤5 |

NOTE 1:
$RB_{start}$ indicates the lowest RB index of transmitted resource blocks
NOTE 2:
$L_{CRB}$ is the length of a contiguous resource block allocation
NOTE 3:
For intra-subframe frequency hopping which intersects Region A, notes 1 and 2 apply on a per slot basis
NOTE 4:
For intra-subframe frequency hopping which intersect Region A, the larger A-MPR value may be applied for both slots in the subframe Table 5 below shows A-MPR according to NS_11.

TABLE 5

| Channel Bandwidth | Parameters | | | |
|---|---|---|---|---|
| 3 | Fc (MHz) | <2004 | ≥2004 | |
| | $L_{CRB}$ (RBs) | 1-15 | >5 | |
| | A-MPR | ≤5 | ≤1 | |
| 5 | Fc (MHz) | <2004 | 2004 ≤ Fc <2007 | ≥2007 |
| | $L_{CRB}$ (RBs) | 1-25 | 1-6 & 8-12 15-25 | >6 |
| | A-MPR | ≤7 | ≤4  0 | ≤1 |
| 10 | Fc (MHz) | 2005 | | |
| | $RB_{start}$ (RBs) | 0-49 | | |
| | $L_{CRB}$ (RBs) | 1-50 | | |
| | A-MPR | ≤12 | | |

Referring to Tables 2 to 5 above, the A-MPR may be determined according to a start location of an RB RB_start and a bandwidth of a RB unit L_CRB for each respective channel bandwidth or region (e.g., Region A/B/C) classified based thereon. The MPR may be applied without higher signaling and may be interpreted as a type of tolerance allowed to a single provider. On the other hand, the A-MPR may be interpreted as a value supposed to be considered during configuration of transmission power of UE in order to protect surrounding bands from power that leaks to next bands.

When a UE using a corresponding BS transmits NS_xx on the SIB2 from the BS as described above, the UE may restrict maximum transmission power ($P_{CMAX}$—maximum transmission power set for the UE) set according to an RB allocated using an A-MPR table associated with each NS_xx and perform transmission so as to control unnecessary emission of the UE, which affects adjacent bands supposed to be protected.

Figure 17:
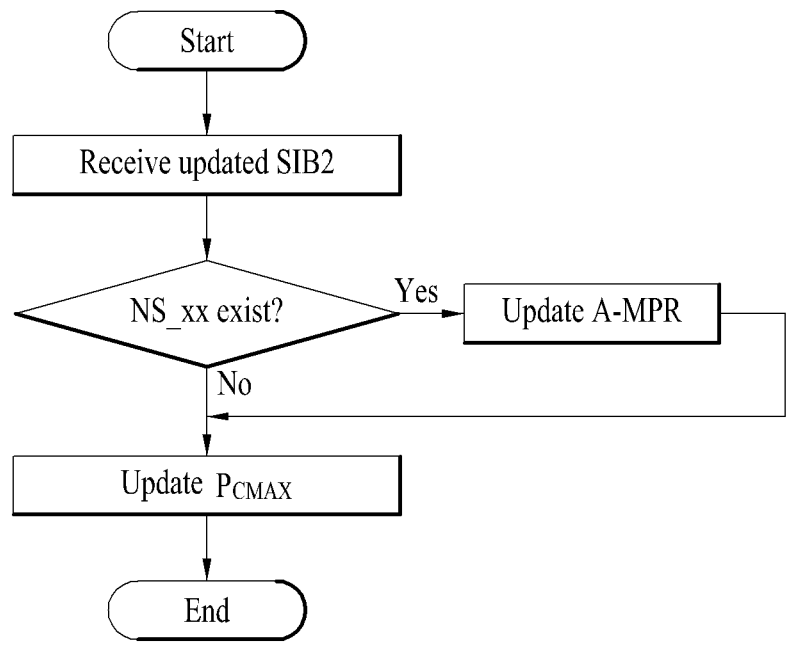
FIG. 17 is a flowchart of application of NS_xx and an A-MPR according thereto.

FIG. 17 is a flowchart of application of NS_xx and an A-MPR according thereto.

Referring to FIG. 17, a UE that receives an updated SIB2 from a BS checks whether the received SIB2 contains NS_xx. When the SIB2 contains NS_xx, the A-MPR is updated using an A-MPR according to the corresponding NS_xx. Both the BS and the UE know the A-MPR table shown in Tables 1 to 5 and the UE updates maximum transmission power $P_{CMAX}$ using the updated A-MPR. On the other hand, when the received SIB2 does not contain NS_xx, the A-MPR is not updated.

As described above, the LTE/LTE-A standard defines corresponding NS_xx and A-MPR tables for each respective specific frequency band. In 3GPP protocol, a maximum of 32 NS_xx may exist. Currently, as shown in Table 1 above, 10 of total NSs (NS_01/NS03/NS_04/NS_05/NS_06/NS_07/NS_08/NS_09/NS_10/NS_11) may be substantially defined.

However, as more frequency bands will be generated in the future, more various types of A-MPR tables may be required and a higher number of NS_xx indicating the use of the tables may be required. Thus, there is a need for a way to overcome the limited number of NS_xx.

A TV white space (TV WS) includes an Ultra High Frequency (UHF) band and a Very High Frequency (VHF) band as a frequency allocated to a broadcast TV and refers to a frequency band in which use of an unlicensed device is allowed under the condition that such use does not hinder communication of a licensed device operating at a corresponding frequency band. Examples of licensed device include TVs, wireless microphones, etc. The licensed device may be called an incumbent user or a primary user.

An unlicensed device which desires to use a TVWS should provide a protection function for a licensed device. Accordingly, the unlicensed device must confirm whether the licensed device occupies a corresponding band before starting signal transmission in the TVWS. To this end, the unlicensed device may confirm whether a corresponding band is being used by the licensed device by performing spectrum sensing. Spectrum sensing mechanisms include energy detection and feature detection. If strength of a signal received through a specific channel is above a prescribed value or if a DTV preamble is detected, the unlicensed device may determine that the licensed device is using the specific channel. Upon determining that the licensed device is using a channel immediately adjacent to a currently used channel, the unlicensed device should lower transmission power thereof.

However, if a station (STA) operating as an unlicensed device depends only upon frequency sensing to acquire available channel information, the STA may encounter an increased burden due to a sensing action for a TVWS and a procedure may be delayed. Meanwhile, an unlicensed device may obtain available channel list information in a corresponding area by accessing a geolocation database (DB) through the Internet or a dedicated network. The geolocation DB stores and manages information about registered licensed devices and information about available channels which dynamically vary according to geographic location and channel use time of the licensed devices.

In the future, when a WRAN or LTE/LTE-A UE performs transmission and reception using a database method or a carrier sensing method in an unlicensed band such as a TV WS band, a transmission and reception channel band may be configured as a unit channel band (e.g., 6 MHz) that is a vacant band among reception bands (e.g., 470 to 698 MHz) of a DTV and it is likely that a UE that performs transmission and reception in this band cannot use an RF front-end filter such as a duplex filter. That is, when the front-end filter that manages a whole band, such as the duplex filter is used, out-of-band emission that enters an Rx antenna port from a Tx antenna port is generally reduced by as much as about 45 to 50 dB, compared with a transmission band. However, it is likely that the UEs that operate in the TV WS band cannot achieve a gain of protection of reception band due to this power reduction.

Figure 18:
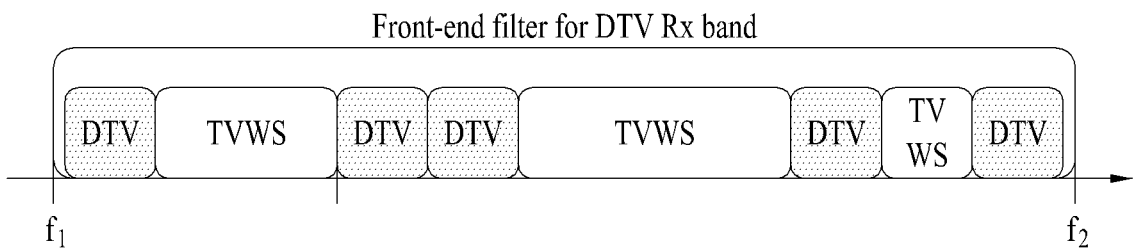
FIG. 18 is a diagram illustrating an example in which a UE coexists with other services such as a DTV through an available channel in a DTV reception band.

FIG. 18 is a diagram illustrating an example in which a UE coexists with other services such as a DTV through an available channel in a DTV reception band.

Referring to FIG. 18, a plurality of available channels (bands indicated by a TV WS of FIG. 18) that are not used by a DTV in the DTV reception band, and a WRAN or LTE/LTE-A UE may use a band allocated thereto among available channels. In this case, the WRAN or LTE/LTE-A UE may first perform front-end filtering that manages a whole TV WS band and receive data of available channels from the BS such that the UE may coexist with a DTV or other WLAN devices without any help of RF filtering.

Thus, with regard to a UE that operates in an unlicensed band such as a TV WS band, interference control using the A-MPR is required and thus numerous combinations of A-MPR tables are required according to whether contiguous channels are occupied. That is, each UE using a WS frequency of a TVWS band requires different A-MPR tables according to whether adjacent bands are used or an allowed amount of interference of a service using the adjacent bands.

To overcome this problem, the present invention proposes a method of controlling interference using restricted NS_xx or various improved A-MPR tables.

Hereinafter, a method of receiving an improved A-MPR table from a BS via network signaling (NS) and controlling transmission power reduction of a UE by the UE will be described.

First, according to the present invention, any one NS_xx among legacy existing NS_xx is allocated to network signaling for the method proposed according to the present invention an A-MPR table associated with the NS_xx may be defined. In addition, needless to say, new network signaling instead of existing defined network signaling may be defined. However, for convenience of description, it is assumed that any one of existing NS_xx is allocated to the network signaling according to the present invention. Here, for example, NS_32 that is a last network signaling value present in the 3GPP standard may be allocated for the same purpose. Hereinafter, for convenience of description, it is assumed that NS_32 is used as NS_xx to be used in the method proposed according to the present invention, and A-MPR associated with NS_xx is referred to as A-MPR$_{xx}$. In addition, A-MPR$_{32}$ associated with NS_32 according to the present invention is defined to achieve sufficient UE transmission power reduction so long as interference is not generated with respect to adjacent bands in all cases.

Figure 19:
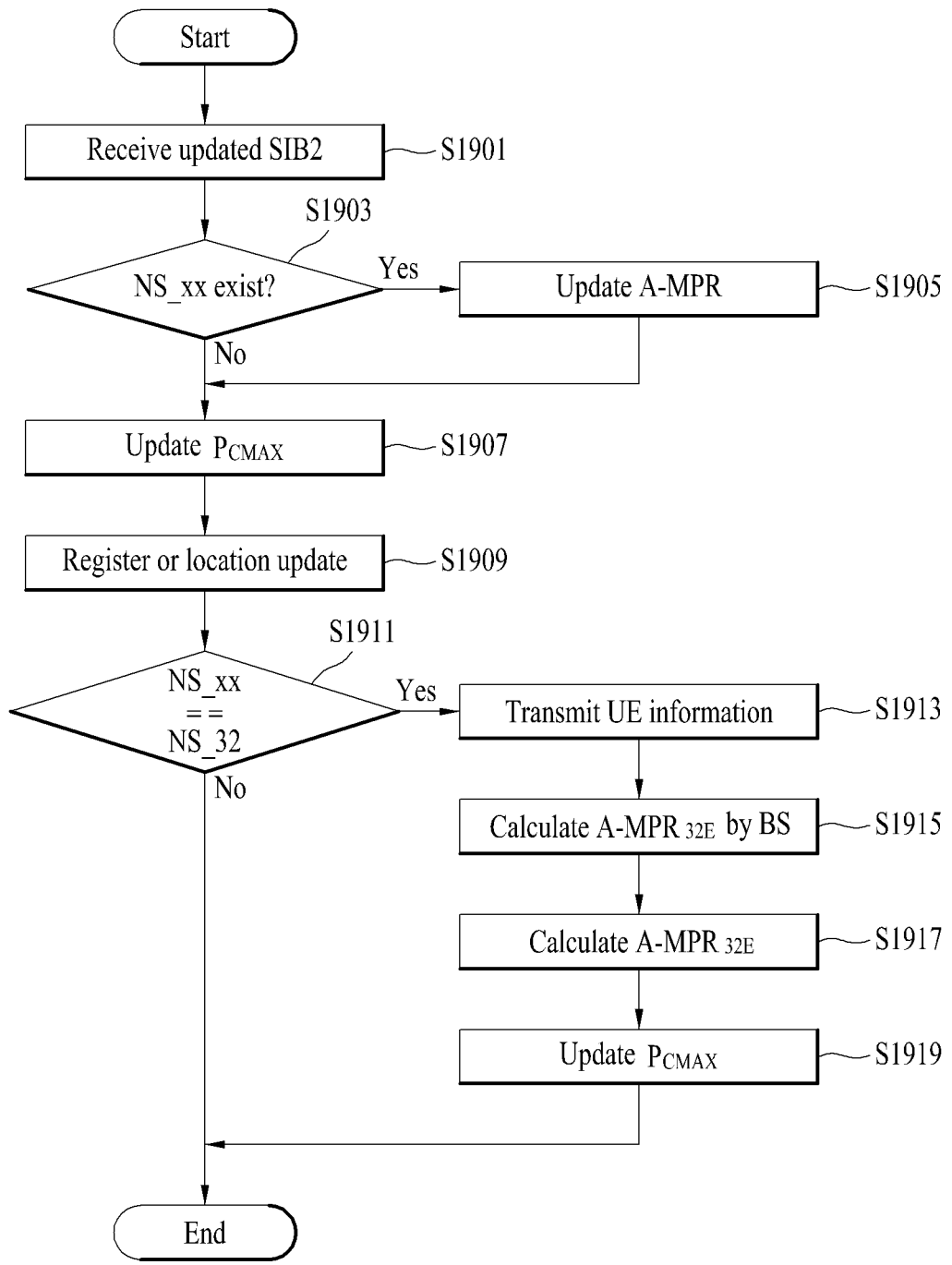
FIG. 19 is a flowchart of a method of controlling UE transmission power using an improved A-MPR table according to an embodiment of the present invention.

FIG. 19 is a flowchart of a method of controlling UE transmission power using an improved A-MPR table according to an embodiment of the present invention.

Referring to FIG. 19, a UE receives updated SIB2 from a specific BS (S1901). Then, the UE checks whether the received SIB2 contains NS_xx (S1903).

When the SIB2 received in S1903 contains NS_xx, the UE updates A-MPR using an A-MPR table A-MPR$_{xx}$ according to the corresponding NS_xx (S1905). Then, the UE updates maximum transmission power P$_{CMAX}$ using the updated A-MPR (S1907). On the other hand, when the SIB2 received in operation S1903 does not contain NS_xx, the UE may not update the A-MPR.

Then, the UE performs a connection procedure with the BS for location registration and location update (S1909).

During the connection procedure with the BS, the UE determines whether the NS_xx received through SIB2 from the BS is the same as network signaling NS_32 that is predefined for configuration of improved A-MPR (S1911). When the BS needs to be controlled for UE transmission power reduction sufficient to all UEs belonging to a cell managed by the BS, the BS may broadcast NS_xx to the all UEs belonging to the corresponding cell. In addition, when the BS needs to be controlled for sufficient UE transmission power reduction according to a frequency band allocated to the corresponding UE per UE, the BS may transmit NS_xx UE-specifically. In addition, the BS needs to be controlled for sufficient UE transmission power reduction per specific group, the BS may multicast NS_xx. This transmission method may be applied to respective BSs or the aforementioned respective cells in different ways.

In operation S1911, when NS_xx received from the BS is NS_32, the corresponding UE transmits UE information for analysis of interference influence to the BS (S1913). Here, the information transmitted from the UE may include, for example, UE location information, UE radio frequency (RF) quality, etc. in order to analyze interference that affects a neighboring system using an adjacent band of a frequency band allocated to the UE. In this case, the UE RF quality may be classified in predetermined classes and represented as low/mid/high linearity.

The BS that receives the information for analysis of the interference influence of the corresponding UE from the UE calculates A-MPR$_{32E}$ (advanced A-MPR$_{32}$) optimized for the corresponding UE based on interference-related information such as the information transmitted from the UE and adjacent frequency allocation information available on a network (S1915). The BS may standardize and use various factors that affect interference, such as adjacent frequency information (e.g., use information of adjacent frequency or permissible service interference degree using adjacent band) of a frequency band allocated to the corresponding UE, and a use amount of radio resources of the adjacent BS, which are additional measured or obtained from a database on a network.

Unlike the above description, the BS may calculate A-MPR$_{32E}$ appropriate for the corresponding UE using only one of information received from the UE, information measured by the BS, and information obtained from the network. In detail, the BS may not receive information for analysis of interference influence from the UE and may use only the information measured by the BS or obtained from the network. That is, in this case, operation S1913 may be omitted. In addition, the BS may use only information for analysis of interference influence, received from the UE.

The BS that calculates A-MPR$_{32E}$ optimized for the UE transmits the calculated A-MPR$_{32E}$ to the corresponding UE (S1917). Here, A-MPR$_{32E}$ may include parameters shown in Tables 1 to 5 above. For example, A-MPR$_{32E}$ may include a start location of an RB RB_start, a bandwidth of an RB unit L_CRB, and an A-MPR parameter for each respective channel bandwidth or region classified based thereon.

Then, the UE that receives A-MPR$_{32E}$ from the BS replaces A-MPR32 with A-MPR$_{32E}$ that is newly received from the BS and thus updates maximum transmission power P$_{CMAX}$ (S1919). That is, the UE restricts the maximum transmission power.

On the other hand, when NS_xx received from the BS in operation S1911 is NS_32, the UE controls the maximum transmission power P$_{CMAX}$ using A-MPR via networking signaling, received in a conventional manner.

4. Overview of Apparatus According to the Present Invention

Figure 20:
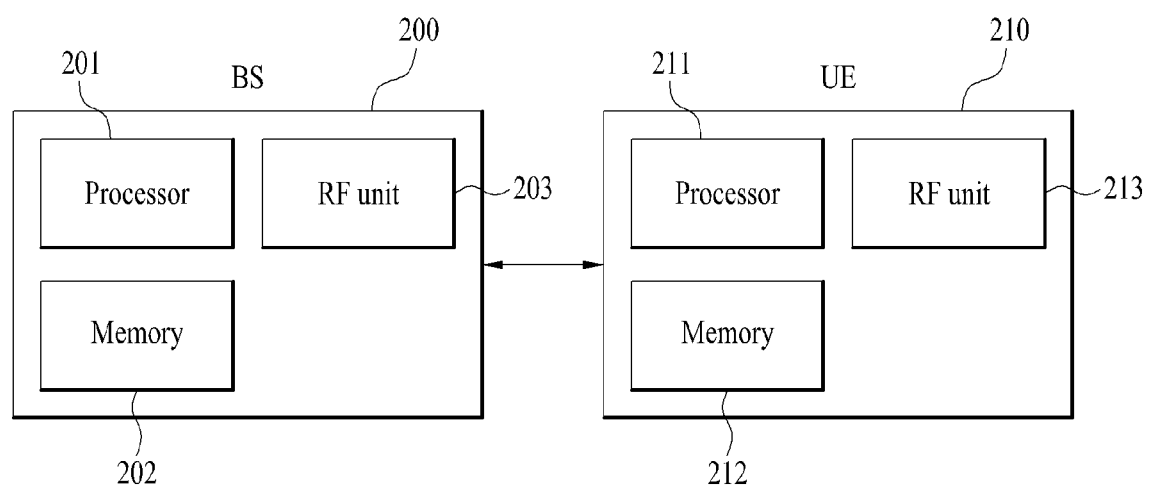
FIG. 20 is a block diagram of a wireless communication apparatus according to an embodiment of the present invention.

FIG. 20 is a block diagram of a wireless communication apparatus according to an embodiment of the present invention.

Referring to FIG. 20, the wireless communication system includes a BS 200 and a plurality of UEs 210 positioned in an area of the BS 200.

The BS 200 includes a processor 201, a memory 202, and a radio frequency (RF) unit 203. The processor 201 implements the suggested function, process, and/or method. Layers of a wireless interface protocol may be implemented by the processor 201. The memory 202 is connected to the processor 201 and stores various information for driving the processor 201. The RF unit 203 is connected to the processor 201 and transmits/receives radio signals.

The UEs 210 includes a processor 211, a memory 212, and an RF unit 213. The processor 211 implements the suggested function, process, and/or method. Layers of a wireless interface protocol may be implemented by the processor 211. The memory 212 is connected to the processor 211 and stores various information for driving the processor 211. The RF unit 213 is connected to the processor 211 and transmits/receives radio signals.

The memories 202 and 212 may be inside or outside the processors 201 and 211, respectively and connected to the processors 201 and 211 as various means, respectively. In addition, the BS 200 and/or the UEs 210 may each have a single antenna or a multiple antenna.

Hereinafter, the processors 201 and 211 of components of the aforementioned BS or UE will be described in greater detail.

Figure 21:
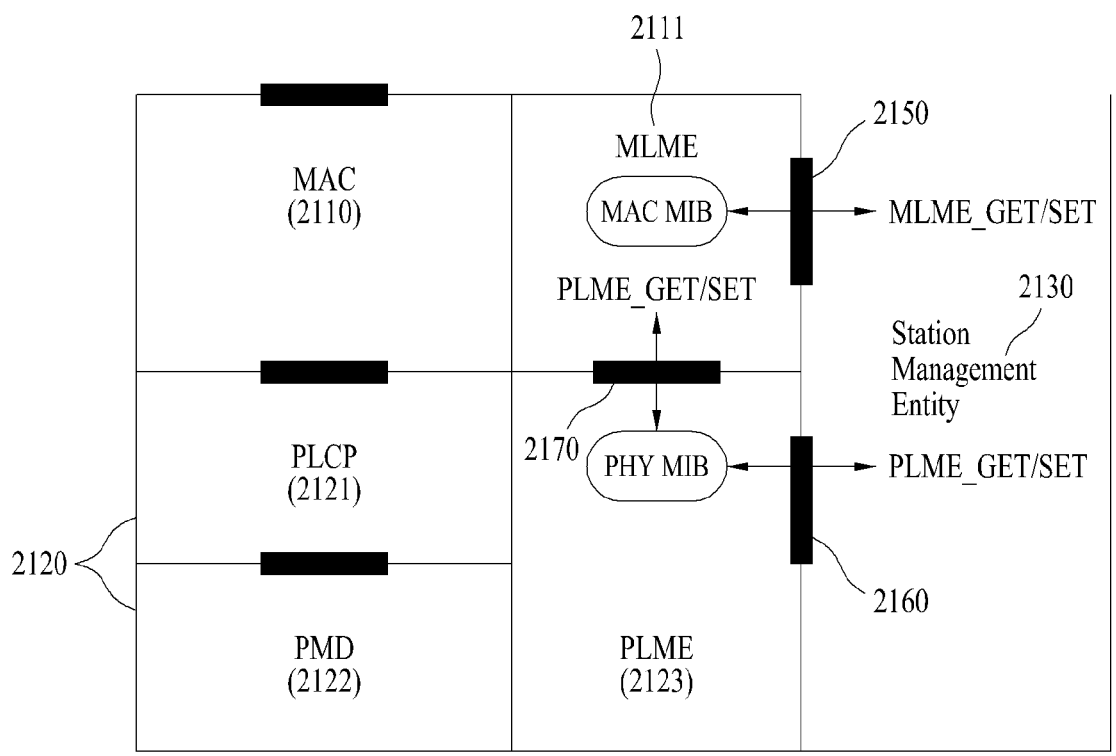
FIG. 21 illustrates an example of a structure of a processor of a BS or a UE according to an embodiment of the present invention.

FIG. 21 illustrates an example of a structure of a processor of a BS or a UE according to an embodiment of the present invention.

Referring to FIG. 21, the processors 201 and 211 of FIG. 20 may have a multi-layer structure. Specifically, among these layers, a MAC subcarrier 2110 and a physical layer 2120 of a data link layer (DLL) will be described in greater detail with reference to FIG. 21.

Referring to FIG. 21, the physical layer 2120 may include a physical layer convergence procedure (PLCP) entity 2121 and a physical medium dependent (PMD) entity 2122. Both the MAC sublayer 2110 and the physical layer 2120 may include management entities as conceptual entities, which may be referred to as a sublayer management entity (MLME) 2111 and a physical layer management entity (PLME) 2123. These entities 2111 and 2121 provide layer management service interfaces via an operation of a layer management function.

In order to provide an accurate MAC operation, a station management entity (SME) 2130 may be present in each UE. The SME 2130 is a management entity independent from each layer, collects layer-based state information from various management entities, or sets values of specific parameters of each layer. The SME 2130 may perform this function instead of general system management entities and implement a standard management protocol.

The aforementioned various entities may interact via various methods. FIG. 21 illustrates an example in which GET/SET primitive is exchanged. XX-GET.request primitive is used to request a value of management information base (MIB) attribute, and XX-GET.confirm primitive returns a value of corresponding MIB attribute when the primitive is in a state 'SUCCESS' and indicates and returns errors on a state field in other cases. XX-SET.request primitive is used to request to set predetermined MIB attribute as a given value. When the MIB attribute refers to a specific operation, this request is used to request execution of the specific operation. In addition, when XX-SET.confirm primitive is in a state 'SUCCESS', this means that the determined MIB attribute is set as a requested value. In other words, a state field indicates an error situation. When the MIB attribute refers to a specific operation, this primitive may be used to check that the corresponding operation is performed.

As illustrated in FIG. 21, the MLME 2111 and the SME 2130, and the PLME 2123 and the SME 2130 may exchange the aforementioned various primitives via an MLME_service access point (MLME_SAP) 2150 and a PLME_service access point (PLME_SAP) 2160, respectively. In addition, the MLME 2111 and the PLME 2123 may exchange primitive via an MLME-PLME_service access point (MLME-PLME_SAP) 2170.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method of transmitting and receiving data in a wireless communication system to a 3$^{rd}$ generation partnership project (3GPP) long term evolution (LTE) system and institute of electrical and electronics engineers (IEEE) 802 has been described, the present invention is applicable to various wireless communication systems.

The invention claimed is:

1. A method for transmitting a signal by a user equipment (UE) in a wireless access system, the method comprising:
    receiving a first network signaling value indicating additional maximum power reduction (A-MPR) via network signaling from a base station (BS);
    i) when the first network signaling value received from the BS is one of a plurality of network signaling values except a predefined network signaling value, transmitting an uplink signal to the BS within a range of a reduced UE maximum transmission power using the A-MPR; and
    ii) when the first network signaling value received from the BS is the predefined network signaling value among the plurality of network signaling values:
        transmitting, to the BS, a message including at least one of location information of the UE and performance information of a radio frequency (RF) unit installed in the UE;
        receiving a second network signaling value indicating an advanced A-MPR via the network signaling from the BS in response to the message; and
        transmitting an uplink signal to the BS within a range of a reduced UE maximum transmission power using the advanced A-MPR,
        wherein the advanced A-MPR is calculated in consideration of whether interference occurs in an adjacent frequency of a band allocated to the UE.

2. The method of claim 1, wherein the advanced A-MPR is calculated using at least one of the location information of the UE and the performance information of the RF unit installed in the UE.

3. The method of claim 1, wherein the advanced A-MPR is calculated using at least one of use information of an adjacent frequency allocated to the UE, permissible service interference degree of a system using an adjacent band, and radio resource use degree in a neighboring BS.

4. The method of claim 1, wherein the UE receives the network signaling during connection with the BS, for registration or location-updating.

5. The method of claim 1, wherein the network signaling is received through a system information block type 2 (SIB2).

6. The method of claim 1, wherein the predefined network signaling value is NS_32.

7. A user equipment (UE) for transmitting a signal to a base station (BS) in a wireless access system, the UE comprising:
    a radio frequency (RF) unit configured to transmit and receive a radio signal; and
    a processor configured to:
        receive a first network signaling value indicating additional maximum power reduction (A-MPR) via network signaling from a base station (BS),
        i) when the first network signaling value received from the BS is one of a plurality of network signaling values except a predefined network signaling value, transmit an uplink signal to the BS within a range of a reduced UE maximum transmission power using the A-MPR, and
        ii) when the first network signaling value received from the BS is the predefined network signaling value among the plurality of network signaling values:
            transmit, to the BS, a message including at least one of location information of the UE and performance information of the RF unit installed in the UE,
            receive a second network signaling value indicating an advanced A-MPR via the network signaling from the BS in response to the message, and
            transmit an uplink signal to the BS within a range of a reduced UE maximum transmission power using the advanced A-MPR,
            wherein the advanced A-MPR is calculated in consideration of whether interference occurs in an adjacent frequency of a band allocated to the UE.

8. The UE of claim 7, wherein the advanced A-MPR is calculated using at least one of the location information of the UE and the performance information of the RF unit installed in the UE.

9. The UE of claim 7, wherein the advanced A-MPR is calculated using at least one of use information of an adjacent frequency allocated to the UE, permissible service interference degree of a system using an adjacent band, and radio resource use degree in a neighboring BS.

10. The UE of claim 7, wherein the UE receives the network signaling during connection with the BS, for registration or location-updating.

11. The UE of claim 7, wherein the network signaling is received through a system information block type 2 (SIB2).

12. The UE of claim 7, wherein the predefined network signaling is NS_32.

* * * * *